US008707680B2

(12) United States Patent  
Bisaiji

(10) Patent No.: US 8,707,680 B2
(45) Date of Patent: Apr. 29, 2014

(54) EXHAUST PURIFICATION SYSTEM OF INTERNAL COMBUSTION ENGINE

(75) Inventor: Yuki Bisaiji, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 211 days.

(21) Appl. No.: 13/499,331

(22) PCT Filed: Aug. 1, 2011

(86) PCT No.: PCT/JP2011/067998
§ 371 (c)(1),
(2), (4) Date: Mar. 30, 2012

(87) PCT Pub. No.: WO2013/018234
PCT Pub. Date: Feb. 7, 2013

(65) Prior Publication Data
US 2013/0034468 A1     Feb. 7, 2013

(51) Int. Cl.
*F01N 3/00*     (2006.01)

(52) U.S. Cl.
USPC ............... 60/285; 60/276; 60/277; 60/286; 60/297

(58) Field of Classification Search
USPC ............... 60/276, 277, 285, 286, 297, 301
See application file for complete search history.

(56) References Cited

U.S. PATENT DOCUMENTS

| | | | | |
|---|---|---|---|---|
| 6,309,536 | B1 * | 10/2001 | Inagaki et al. | 205/781 |
| 7,073,320 | B2 * | 7/2006 | Moritsugu et al. | 60/276 |
| 7,409,822 | B2 * | 8/2008 | Asanuma | 60/285 |
| 8,047,063 | B2 * | 11/2011 | Hirota et al. | 73/114.71 |
| 8,161,794 | B2 * | 4/2012 | Otsuki et al. | 73/23.31 |
| 2003/0101713 | A1 | 6/2003 | Dalla Betta et al. | |
| 2004/0050037 | A1 | 3/2004 | Betta et al. | |
| 2004/0168431 | A1 | 9/2004 | Goralski, Jr. et al. | |
| 2008/0053073 | A1 | 3/2008 | Kalyanaraman et al. | |
| 2009/0000277 | A1 | 1/2009 | Yoshida et al. | |
| 2010/0242459 | A1 | 9/2010 | Tsujimoto et al. | |

FOREIGN PATENT DOCUMENTS

| | | |
|---|---|---|
| JP | A-2000-145434 | 5/2000 |
| JP | A-2004-316458 | 11/2004 |
| JP | A-2005-113801 | 4/2005 |
| JP | A-2007-514090 | 5/2007 |
| JP | B-3969450 | 6/2007 |
| JP | A-2009-168031 | 7/2009 |
| WO | WO 2009/082035 A1 | 7/2009 |

OTHER PUBLICATIONS

International Search Report issued in International Patent Application No. PCT/JP2010/055487 dated Jun. 22, 2010.
U.S. Appl. No. 13/255,786 in the name of Bisaiji et al., filed Sep. 22, 2011.

(Continued)

*Primary Examiner* — Binh Q Tran
(74) *Attorney, Agent, or Firm* — Oliff PLC

(57) ABSTRACT

In an internal combustion engine, inside of an engine exhaust passage, air-fuel ratio sensors each of which has a solid electrolyte, electrodes which respectively cover the two side surfaces of the solid electrolyte, and a diffusion resistance layer which covers one of electrodes are arranged. In operation, the greater the amounts of deposition of sulfur ingredients at the air-fuel ratio sensors, the smaller the amounts of change of the air-fuel ratios detected by the air-fuel ratio sensor and the longer the time period of change of the air-fuel ratios. The amounts of sulfur poisoning of the air-fuel ratio sensors are detected from the changes of the air-fuel ratios detected by the air-fuel ratio sensors.

15 Claims, 24 Drawing Sheets

(56) References Cited

OTHER PUBLICATIONS

U.S. Appl. No. 13/259,712 in the name of Bisaiji et al., filed Oct. 3, 2011.

Office Action dated Nov. 7, 2013 issued in U.S. Appl. No. 13/255,786.

Office Action dated Jul. 22, 2013 issued in U.S. Appl. No. 13/255,786.

* cited by examiner

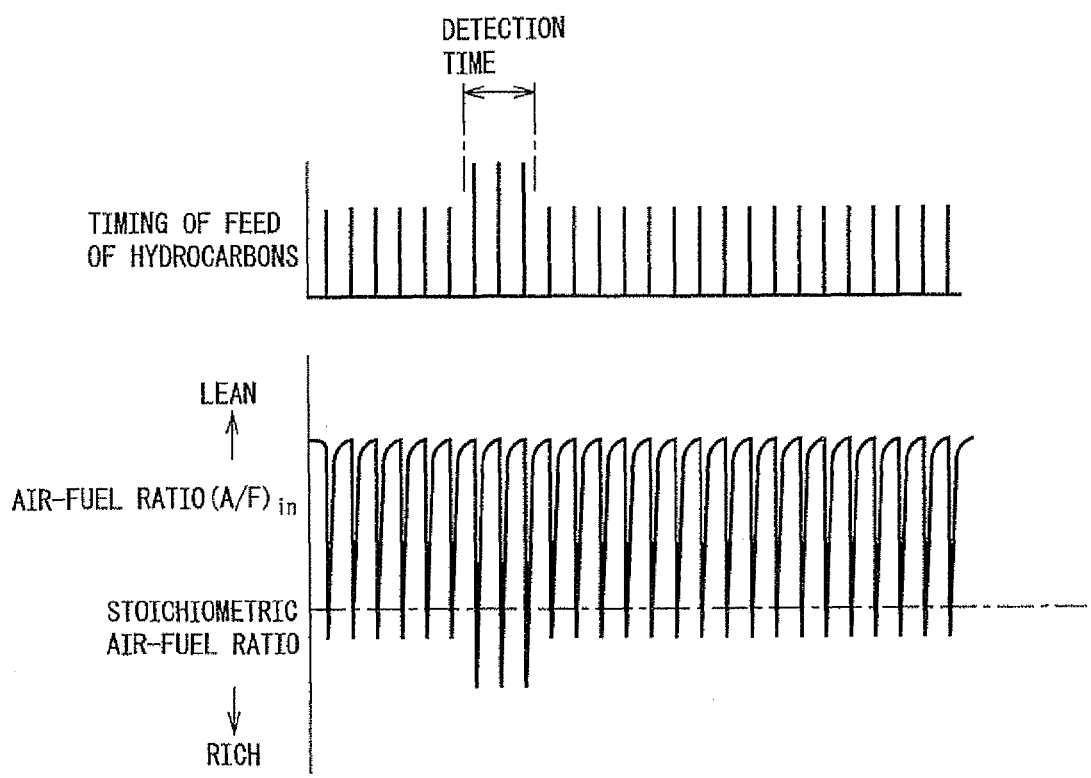
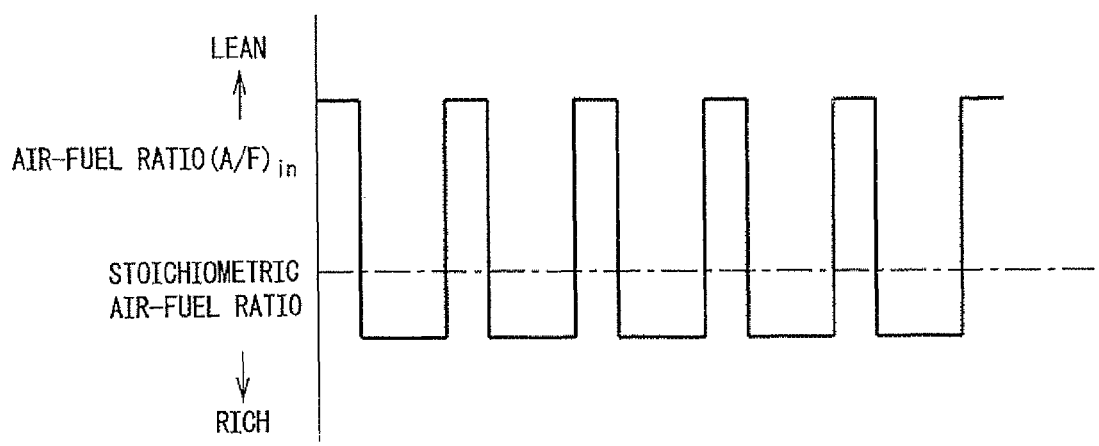

EXHAUST PURIFICATION SYSTEM OF INTERNAL COMBUSTION ENGINE

TECHNICAL FIELD

The present invention relates to an exhaust purification system of an internal combustion engine.

BACKGROUND ART

Known in the art is an internal combustion engine which arranges, in an engine exhaust passage, an $NO_x$ storage catalyst which stores $NO_x$ which is contained in exhaust gas when the air-fuel ratio of the inflowing exhaust gas is lean and which releases the stored $NO_x$ when the air-fuel ratio of the inflowing exhaust gas becomes rich, which arranges a fuel addition valve in the engine exhaust passage upstream of the $NO_x$ storage catalyst, which arranges an air-fuel ratio sensor inside the engine exhaust passage downstream of the $NO_x$ storage catalyst, and which uses the output signal of the air-fuel ratio sensor as the basis for feedback control of the air-fuel ratio of the exhaust gas which flows into the NOx storage catalyst to a target air-fuel ratio (see, for example, Patent Literature 1).

In this regard, it is known that this air-fuel ratio sensor gradually deteriorates if exposed to the heat of high temperature exhaust gas over a long time period or if poisoned by the HC in the exhaust gas, and as a result, the air-fuel ratio detected by the air-fuel ratio sensor can no longer accurately express the actual air-fuel ratio. In this regard, exhaust gas contains $SO_x$. In this case, the air-fuel ratio sensor is believed to be affected by this $SO_x$. However, how the air-fuel ratio detected by the air-fuel ratio sensor is affected by this $SO_x$ which is contained exhaust gas has not been known at all up to now.

CITATIONS LIST

Patent Literature

Patent Literature 1: Japanese Patent Publication (A) No. 2004-316458

SUMMARY OF INVENTION

Technical Problem

Therefore, the inventors studied how the air-fuel ratio detected by an air-fuel ratio sensor is affected by the $SO_x$ contained in the exhaust gas and as a result discovered a relationship between the air-fuel ratio detected by the air-fuel ratio sensor and sulfur poisoning of the air-fuel ratio sensor.

An object of the present invention is to provide an exhaust purification system of an internal combustion engine which is designed to detect sulfur poisoning of an air-fuel ratio sensor based on this discovered relationship.

Solution to Problem

According to the present invention, there is provided an exhaust purification system of an internal combustion engine in which an air-fuel ratio sensor for detecting an air-fuel ratio of exhaust gas is arranged in an engine exhaust passage and an exhaust purification control is performed based on an air-fuel ratio detected by the air-fuel ratio sensor, wherein the air-fuel ratio sensor is comprised of a type of sensor which has a solid electrolyte, electrodes respectively covering two side surfaces of the solid electrolyte, and a diffusion resistance layer covering one of electrodes and in which exhaust gas is guided on to the diffusion resistance layer, when the air-fuel ratio of the exhaust gas changes and the air-fuel ratio detected by the air-fuel ratio sensor changes, the change of the air-fuel ratio detected by the air-fuel ratio sensor is governed by an amount of deposition of sulfur ingredients at the air-fuel ratio sensor, at this time, the larger the amount of deposition of sulfur ingredients at the air-fuel ratio sensor becomes, the smaller an amount of change of the air-fuel ratio detected by the air-fuel ratio sensor and the longer a time period of change of the air-fuel ratio become, and an amount of sulfur poisoning of the air-fuel ratio sensor is detected from the change of the air-fuel ratio detected by the air-fuel ratio sensor at this time.

Advantageous Effects of Invention

It is possible to detect an amount of sulfur poisoning of an air-fuel ratio sensor.

BRIEF DESCRIPTION OF DRAWINGS

FIGS. 6A and 68 are views for explaining an oxidation reduction reaction in an exhaust purification catalyst.

FIGS. 7A and 78 are views for explaining an oxidation reduction reaction in an exhaust purification catalyst.

FIG. 28 is a view which shows a change in an air-fuel ratio of exhaust gas which flows into an exhaust purification catalyst etc.

FIG. 29 is a view which shows a change in an air-fuel ratio of exhaust gas which flows into an exhaust purification catalyst.

DESCRIPTION OF EMBODIMENTS

Figure 1:
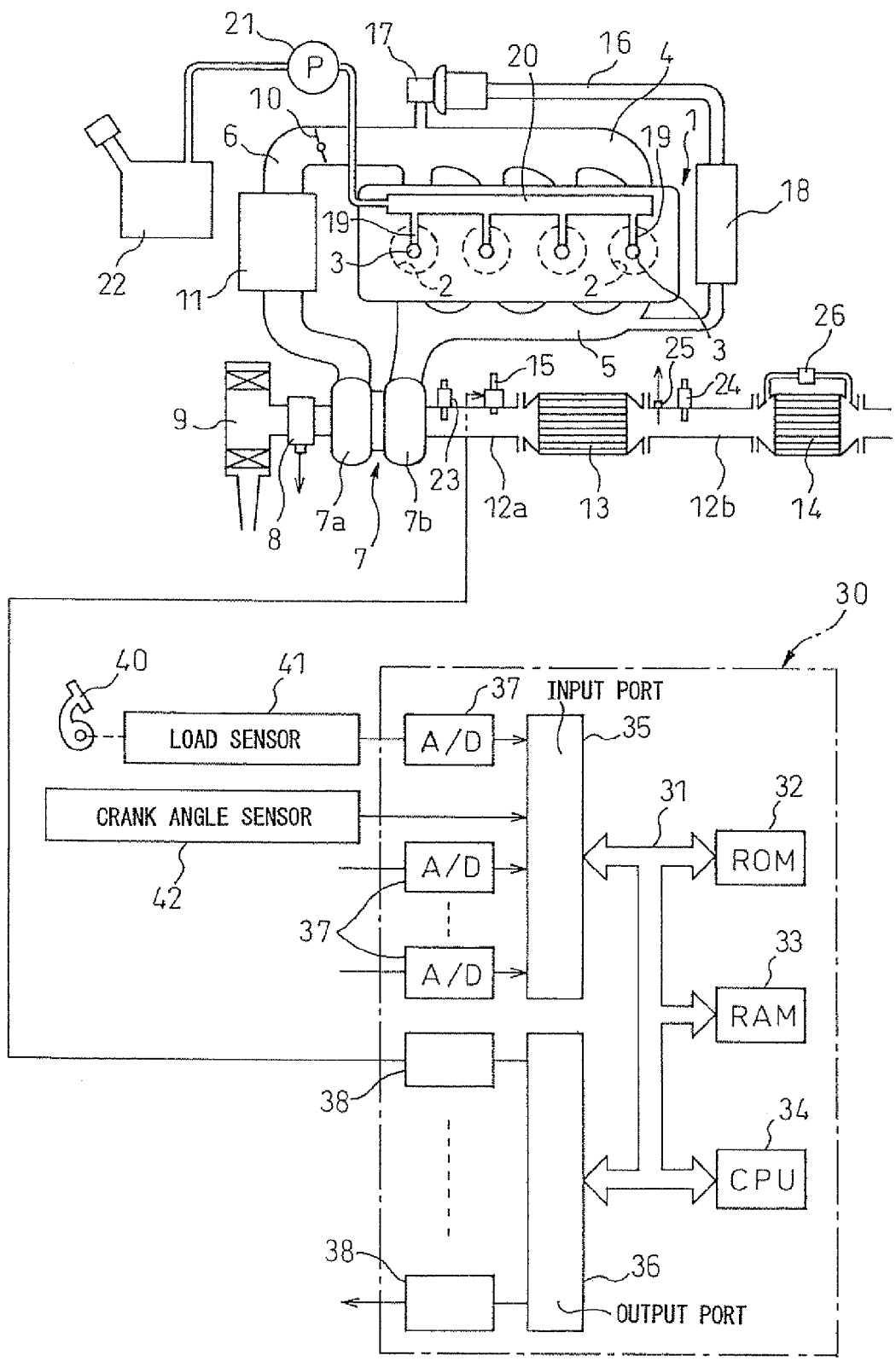
FIG. 1 is an overall view of a compression ignition type internal combustion engine.

FIG. 1 is an overall view of a compression ignition type internal combustion engine.

Referring to FIG. 1, 1 indicates an engine body, 2 a combustion chamber of each cylinder, 3 an electronically controlled fuel injector for injecting fuel into each combustion chamber 2, 4 an intake manifold, and 5 an exhaust manifold. The intake manifold 4 is connected through an intake duct 6 to an outlet of a compressor 7a of an exhaust turbocharger 7, while an inlet of the compressor 7a is connected through an intake air amount detector 8 to an air cleaner 9. Inside the intake duct 6, a throttle valve 10 driven by a step motor is arranged. Furthermore, around the intake duct 6, a cooling device 11 is arranged for cooling the intake air which flows through the inside of the intake duct 6. In the embodiment shown in FIG. 1, the engine cooling water is guided to the inside of the cooling device 11 where the engine cooling water is used to cool the intake air.

On the other hand, the exhaust manifold 5 is connected to an inlet of an exhaust turbine 7b of the exhaust turbocharger 7. An outlet of the exhaust turbine 7b is connected through an exhaust pipe 12a to an inlet of the exhaust purification catalyst 13, while an outlet of the exhaust purification catalyst 13 is connected through an exhaust pipe 12b to a particulate filter 14 for trapping particulate which is contained in exhaust gas.

Inside the exhaust pipe 12a upstream of the exhaust purification catalyst 13, a hydrocarbon feed valve 15 is arranged for feeding hydrocarbons comprised of diesel oil or other fuel used as fuel for a compression ignition type internal combustion engine. In the embodiment shown in FIG. 1, diesel oil is used as the hydrocarbons which are fed from the hydrocarbon feed valve 15. Note that, the present invention can also be applied to a spark ignition type internal combustion engine in which fuel is burned under a lean air-fuel ratio. In this case, from the hydrocarbon feed valve 15, hydrocarbons comprised of gasoline or other fuel used as fuel of a spark ignition type internal combustion engine are fed.

On the other hand, the exhaust manifold 5 and the intake manifold 4 are connected with each other through an exhaust gas recirculation (hereinafter referred to as an "EGR") passage 16. Inside the EGR passage 16, an electronically controlled EGR control valve 17 is arranged. Further, around the EGR passage 16, a cooling device 18 is arranged for cooling EGR gas flowing through the inside of the EGR passage 16. In the embodiment shown in FIG. 1, the engine cooling water is guided to the inside of the cooling device 18 where the engine cooling water is used to cool the EGR gas. On the other hand, each fuel injector 3 is connected through a fuel feed tube 19 to a common rail 20. This common rail 20 is connected through an electronically controlled variable discharge fuel pump 21 to a fuel tank 22. The fuel which is stored inside of the fuel tank 22 is fed by the fuel pump 21 to the inside of the common rail 20. The fuel which is fed to the inside of the common rail 20 is fed through each fuel feed tube 19 to the fuel injector 3.

An electronic control unit 30 is comprised of a digital computer provided with a ROM (read only memory) 32, a RAM (random access memory) 33, a CPU (microprocessor) 34, an input port 35, and an output port 36, which are connected with each other by a bidirectional bus 31. Inside of the exhaust pipe 12a upstream of the hydrocarbon feed valve 15, an upstream side air-fuel ratio sensor 23 for detecting an air-fuel ratio of the exhaust gas which is exhausted from the engine is arranged, while inside of the exhaust pipe 12b downstream of the exhaust purification catalyst 13, a downstream side air-fuel ratio sensor 24 is arranged for detecting an air-fuel ratio of the exhaust gas which flows out from the exhaust purification catalyst 13. Further, downstream of the exhaust purification catalyst 13, a temperature sensor 24 is arranged for detecting the temperature of the exhaust purification catalyst 13, while at the particulate filter 14, a differential pressure sensor 26 is attached for detecting a differential pressure before and after the particulate filter 14. The output signals of these upstream side air-fuel ratio sensor 23, downstream side air-fuel ratio sensor 24, temperature sensor 25, differential pressure sensor 26, and intake air amount detector 8 are input through respectively corresponding AD converters 37 to the input port 35.

Further, an accelerator pedal 40 has a load sensor 41 connected to it which generates an output voltage proportional to the amount of depression L of the accelerator pedal 40. The output voltage of the load sensor 41 is input through a corresponding AD converter 37 to the input port 35. Furthermore, at the input port 35, a crank angle sensor 42 is connected which generates an output pulse every time a crankshaft rotates by, for example, 15°. On the other hand, the output port 36 is connected through corresponding drive circuits 38 to each fuel injector 3, step motor for driving the throttle valve 10, hydrocarbon feed valve 15, EGR control valve 17, and fuel pump 21.

Figure 2:
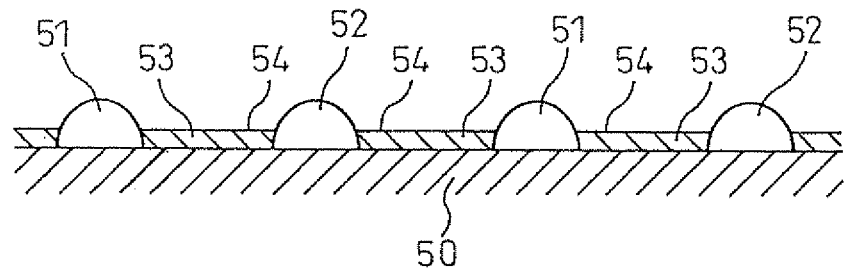
FIG. 2 is a view which schematically shows a surface part of a catalyst carrier.

FIG. 2 schematically shows a surface part of a catalyst carrier which is carried on a substrate of the exhaust purification catalyst 13. At this exhaust purification catalyst 13, as shown in FIG. 2, for example, there is provided a catalyst carrier 50 made of alumina on which precious metal catalysts 51 and 52 are carried. Furthermore, on this catalyst carrier 50, a basic layer 53 is formed which includes at least one element selected from potassium K, sodium Na, cesium Cs, or another such alkali metal, barium Ba, calcium Ca, or another such alkali earth metal, a lanthanoid or another such rare earth and silver Ag, copper Cu, iron Fe, iridium Ir, or another metal able to donate electrons to $NO_x$. The exhaust gas flows along the top of the catalyst carrier 50, so the precious metal catalysts 51 and 52 can be said to be carried on the exhaust gas flow surface of the exhaust purification catalyst 13. Further, the surface of the basic layer 53 exhibits basicity, so the surface of the basic layer 53 is called the basic exhaust gas flow surface part 54.

On the other hand, in FIG. 2, the precious metal catalyst 51 is comprised of platinum Pt, while the precious metal catalyst 52 is comprised of rhodium Rh. That is, the precious metal catalysts 51 and 52 which are carried on the catalyst carrier 50 are comprised of platinum Pt and rhodium Rh. Note that, on the catalyst carrier 50 of the exhaust purification catalyst 13, in addition to platinum Pt and rhodium Rh, palladium Pd may be further carried or, instead of rhodium Rh, palladium Pd may be carried. That is, the precious metal catalysts 51 and 52 which are carried on the catalyst carrier 50 are comprised of platinum Pt and at least one of rhodium Rh and palladium Pd.

Figure 3:
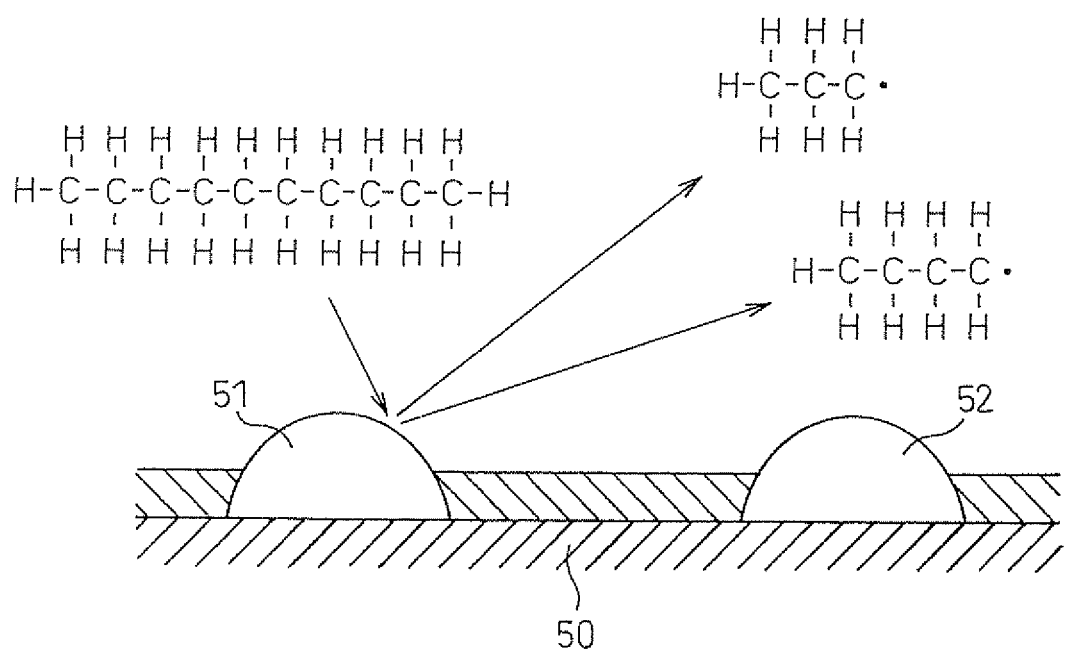
FIG. 3 is a view for explaining an oxidation reaction in an exhaust purification catalyst.

If hydrocarbons are injected from the hydrocarbon feed valve 15 into the exhaust gas, the hydrocarbons are reformed by the exhaust purification catalyst 13. In the present invention, at this time, the reformed hydrocarbons are used to remove the $NO_x$ at the exhaust purification catalyst 13. FIG. 3 schematically shows the reforming action performed at the exhaust purification catalyst 13 at this time. As shown in FIG. 3, the hydrocarbons HC which are injected from the hydrocarbon feed valve 15 become radical hydrocarbons HC with a small carbon number by the catalyst 51.

Figure 4:
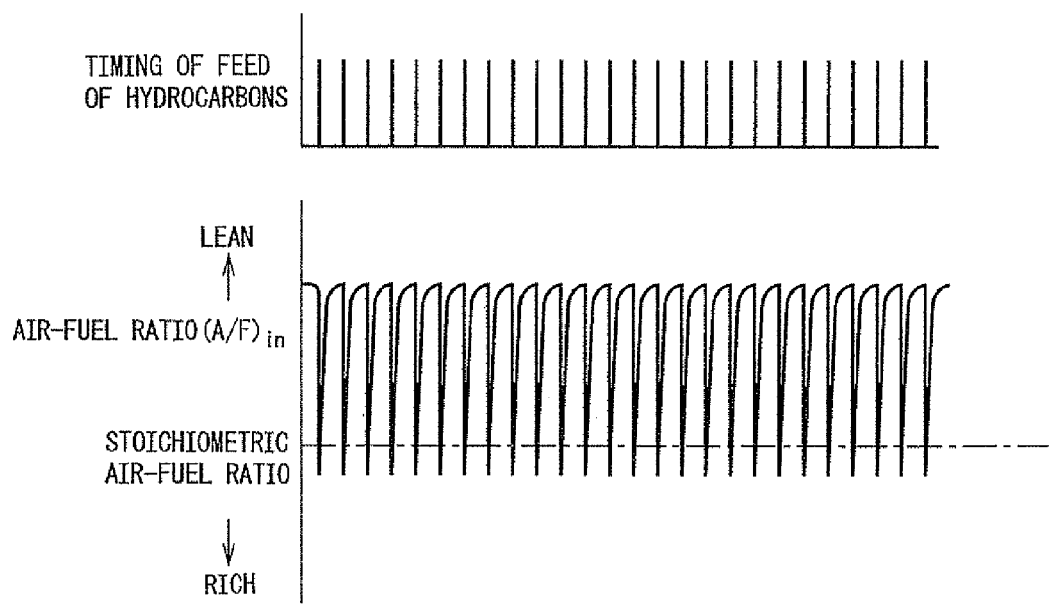
FIG. 4 is a view which shows a change of an air-fuel ratio of exhaust gas flowing into an exhaust purification catalyst.

FIG. 4 shows the feed timing of hydrocarbons from the hydrocarbon feed valve 15 and the change in the air-fuel ratio (A/F)in of the exhaust gas which flows into the exhaust purification catalyst 13. Note that, the changes in the air-fuel ratio (A/F)in depend on the change in concentration of the hydrocarbons in the exhaust gas which flows into the exhaust purification catalyst 13, so it can be said that the change in the air-fuel ratio (A/F)in shown in FIG. 4 expresses the change in concentration of the hydrocarbons. However, if the hydrocarbon concentration becomes higher, the air-fuel ratio (A/F)in becomes smaller, so, in FIG. 4, the more to the rich side the air-fuel ratio (A/F)in becomes, the higher the hydrocarbon concentration.

Figure 5:
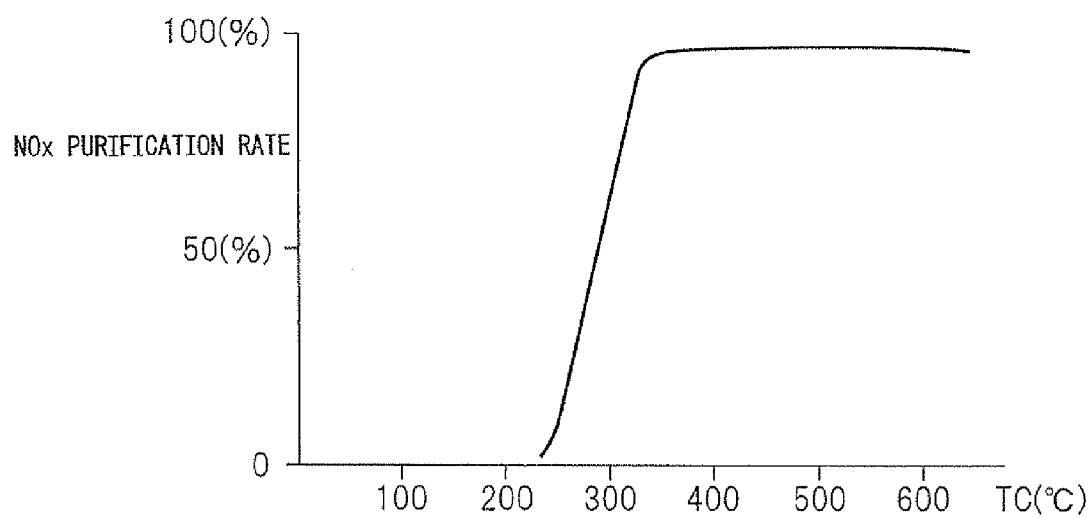
FIG. 5 is a view which shows an $NO_x$ purification rate.

FIG. 5 shows the $NO_x$ purification rate by the exhaust purification catalyst 13 with respect to the catalyst temperatures of the exhaust purification catalyst 13 when periodically making the concentration of hydrocarbons which flow into the exhaust purification catalyst 13 change so as to, as shown in FIG. 4, make the air-fuel ratio (A/F)in of the exhaust gas flowing to the exhaust purification catalyst 13 change. The inventors engaged in research relating to $NO_x$ purification for a long time. In the process of research, they learned that if making the concentration of hydrocarbons which flow into the exhaust purification catalyst 13 vibrate by within a predetermined range of amplitude and within a predetermined range of period, as shown in FIG. 5, an extremely high $NO_x$ purification rate is obtained even in a 400° C. or higher high temperature region.

Figure 6A:
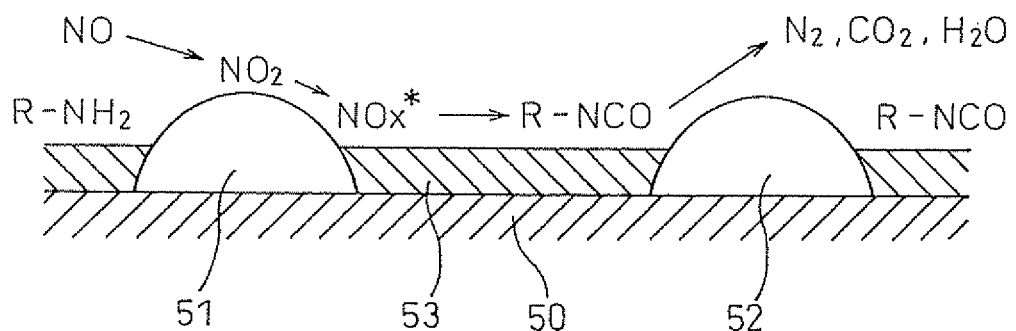
Figure 6B:
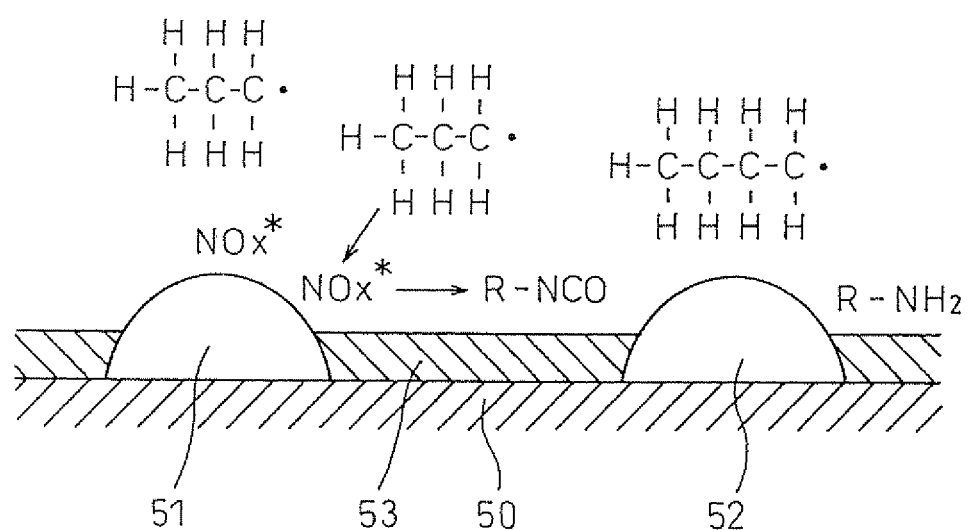

Furthermore, at this time, a large amount of reducing intermediate which contains nitrogen and hydrocarbons continues to be held or adsorbed on the surface of the basic layer 53, that is, on the basic exhaust gas flow surface part 54 of the exhaust purification catalyst 13. It is learned that this reducing intermediate plays a central role in obtaining a high $NO_x$ purification rate. Next, this will be explained with reference to FIGS. 6A and 6B. Note that, these FIGS. 6A and 6B schematically show the surface part of the catalyst carrier 50 of the exhaust purification catalyst 13. These FIGS. 6A and 6B show the reaction which is presumed to occur when the concentration of hydrocarbons which flow into the exhaust purification catalyst 13 is made to vibrate by within a predetermined range of amplitude and within a predetermined range of period.

FIG. 6A shows when the concentration of hydrocarbons which flow into the exhaust purification catalyst 13 is low, while FIG. 6B shows when hydrocarbons are fed from the hydrocarbon feed valve 15 and the concentration of hydrocarbons which flow into the exhaust purification catalyst 13 becomes higher.

Now, as will be understood from FIG. 4, the air-fuel ratio of the exhaust gas which flows into the exhaust purification catalyst 13 is maintained lean except for an instant, so the exhaust gas which flows into the exhaust purification catalyst 13 normally becomes a state of oxygen excess. Therefore, the NO which is contained in the exhaust gas, as shown in FIG. 6A, is oxidized on the platinum 51 and becomes $NO_2$. Next, this $NO_2$ is further oxidized and becomes $NO_3$. Further part of the $NO_2$ becomes $NO_2^-$. In this case, the amount of production of $NO_3$ is far greater than the amount of production of $NO_2^-$. Therefore, on the platinum Pt 51, a large amount of $NO_3$ and a small amount of $NO_2^-$ are produced. These $NO_3$ and $NO_2^-$ are strong in activity. Below, these $NO_3$ and $NO_2^-$ will be referred to as the active $NO_x^*$.

On the other hand, if hydrocarbons are fed from the hydrocarbon feed valve 15, as shown in FIG. 3, the hydrocarbons are reformed and become radicalized inside of the exhaust purification catalyst 13. As a result, as shown in FIG. 6B, the hydrogen concentration around the active $NO_x^*$ becomes higher. In this regard, if, after the active $NO_x$ is produced, the state of a high oxygen concentration around the active $NO_x^*$ continues for a constant time or more, the active $NO_x^*$ is oxidized and is absorbed in the form of nitrate ions $NO_3^-$ inside the basic layer 53. However, if, before this constant time elapses, the hydrocarbon concentration around the active $NO_x^*$ becomes higher, as shown in FIG. 6B, the active $NO_x^*$ reacts on the platinum 51 with the radical hydrocarbons HC to thereby form the reducing intermediate. This reducing intermediate is adhered or adsorbed on the surface of the basic layer 53.

Note that, at this time, the first produced reducing intermediate is considered to be a nitro compound R—$NO_2$. If this nitro compound R—$NO_2$ is produced, the result becomes a nitrile compound R—CN, but this nitrile compound R—CN can only survive for an instant in this state, so immediately becomes an isocyanate compound R—NCO. This isocyanate compound R—NCO becomes an amine compound R—$NH_2$ if hydrolyzed. However, in this case, what is hydrolyzed is considered to be part of the isocyanate compound R—NCO. Therefore, as shown in FIG. 6B, the majority of the reducing intermediate which is held or adsorbed on the surface of the basic layer 53 is believed to be the isocyanate compound R—NCO and amine compound R—$NH_2$.

On the other hand, as shown in FIG. 6B, if the produced reducing intermediate is surrounded by the hydrocarbons HC, the reducing intermediate is blocked by the hydrocarbons HC and the reaction will not proceed any further. In this case, if the concentration of hydrocarbons which flow into the exhaust purification catalyst 13 is lowered and thereby the oxygen concentration becomes higher, the hydrocarbons around the reducing intermediate will be oxidized. As a result, as shown in FIG. 6A, the reducing intermediate and the active $NO_x^*$ react. At this time, the active $NO_x^*$ reacts with the reducing intermediate R—NCO or R—$NH_2$ to become $N_2$, $CO_2$, $H_2O$, therefore the $NO_x$ is removed.

In this way, in the exhaust purification catalyst 13, by making the concentration of hydrocarbons which flow into the exhaust purification catalyst 13 higher, a reducing intermediate is produced. The concentration of hydrocarbons which flow into the exhaust purification catalyst 13 is lowered and the oxygen concentration is raised so that the active $NO_x^*$ reacts with the reducing intermediate and the $NO_x$ is removed. That is, in order for the exhaust purification catalyst 13 to remove the $NO_x$, the concentration of hydrocarbons which flow into the exhaust purification catalyst 13 has to be periodically changed.

Of course, in this case, it is necessary to raise the concentration of hydrocarbons to a concentration sufficiently high for producing the reducing intermediate and it is necessary to lower the concentration of hydrocarbons to a concentration sufficiently low for making the produced reducing intermediate react with the active $NO_x^*$. That is, it is necessary to make the concentration of hydrocarbons which flow into the exhaust purification catalyst 13 vibrate by within a predetermined range of amplitude. Note that, in this case, it is necessary to hold a sufficient amount of reducing intermediate R—NCO or R—$NH_2$ on the basic layer 53, that is, the basic exhaust gas flow surface part 24, until the produced reducing intermediate reacts with the active $NO_x^*$. For this reason, the basic exhaust gas flow surface part 24 is provided.

On the other hand, if lengthening the feed period of the hydrocarbons, the time in which the oxygen concentration becomes higher becomes longer in the period after the hydrocarbons are fed until the hydrocarbons are next fed. Therefore, the active $NO_x^*$ is absorbed in the basic layer 53 in the form of nitrates without producing a reducing intermediate. To avoid this, it is necessary to make the concentration of hydrocarbons which flow into the exhaust purification catalyst 13 vibrate by within a predetermined range of period.

Therefore, in an embodiment of the present invention, to make the $NO_x$ contained in the exhaust gas and the reformed hydrocarbons react and produce the reducing intermediate R—NCO or R—$NH_2$ containing nitrogen and hydrocarbons, the precious metal catalysts 51 and 52 are carried on the exhaust gas flow surface of the exhaust purification catalyst 13. To hold the produced reducing intermediate R—NCO or R—$NH_2$ inside the exhaust purification catalyst 13, a basic exhaust gas flow surface part 54 is formed around the precious metal catalysts 51 and 52. $NO_x$ is reduced by the reducing action of the reducing intermediate R—NCO or R—$NH_2$ held on the basis exhaust gas flow surface part 54, and the vibration period of the hydrocarbon concentration is made the vibration period required for continuation of the production of the reducing intermediate R—NCO or R—$NH_2$. Incidentally, in the example shown in FIG. 4, the injection interval is made 3 seconds.

Figure 7A:
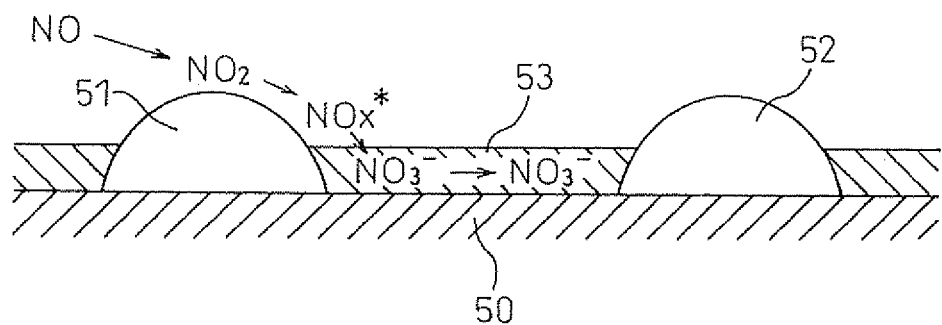

If the vibration period of the hydrocarbon concentration, that is, the feed period of the hydrocarbons HC, is made longer than the above predetermined range of period, the reducing intermediate R—NCO or R—$NH_2$ disappears from the surface of the basic layer 53. At this time, the active $NO_x^*$ which is produced on the platinum Pt 53, as shown in FIG. 7A, diffuses in the basic layer 53 in the form of nitrate ions $NO_3^-$ and becomes nitrates. That is, at this time, the $NO_x$ in the exhaust gas is absorbed in the form of nitrates inside of the basic layer 53.

Figure 7B:
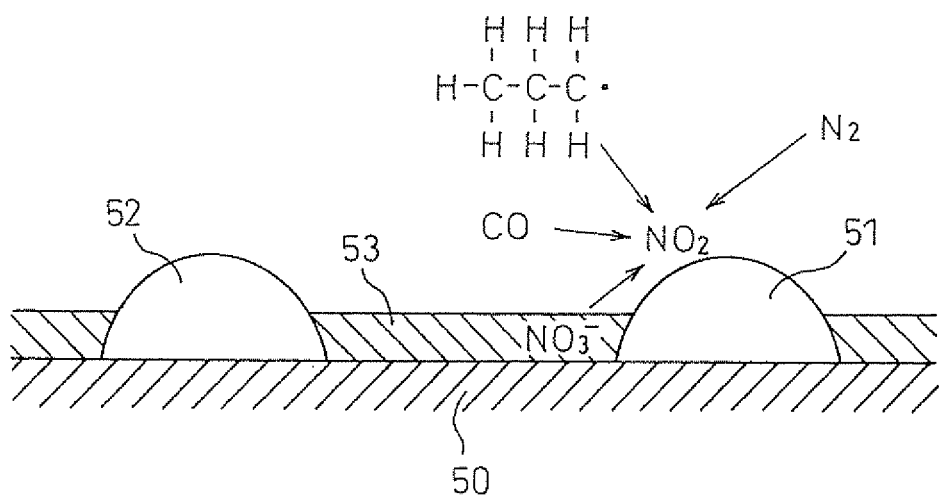

On the other hand, FIG. 7B shows the case where the air-fuel ratio of the exhaust gas which flows into the exhaust purification catalyst 13 is made the stoichiometric air-fuel ratio or rich when the $NO_x$ is absorbed in the form of nitrates inside of the basic layer 53. In this case, the oxygen concentration in the exhaust gas falls, so the reaction proceeds in the opposite direction ($NO_3^- \rightarrow NO_2$), and consequently the nitrates absorbed in the basic layer 53 become nitrate ions $NO_3^-$ one by one and, as shown in FIG. 7B, are released from the basic layer 53 in the form of $NO_2$. Next, the released $NO_2$ is reduced by the hydrocarbons HC and CO contained in the exhaust gas.

Figure 8:
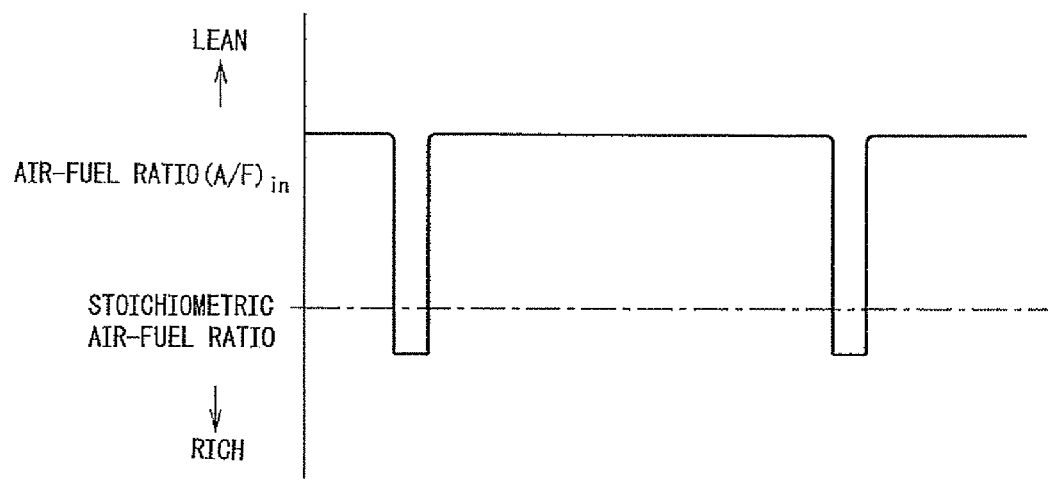
FIG. 8 is a view which shows a change of an air-fuel ratio of exhaust gas flowing into an exhaust purification catalyst.

FIG. 8 shows the case of making the air-fuel ratio (A/F)in of the exhaust gas which flows into the exhaust purification catalyst 13 temporarily rich slightly before the $NO_x$ absorption ability of the basic layer 53 becomes saturated. Note that, in the example shown in FIG. 8, the time interval of this rich control is 1 minute or more. In this case, the $NO_x$ which was absorbed in the basic layer 53 when the air-fuel ratio (A/F)in of the exhaust gas was lean is released all at once from the basic layer 53 and reduced when the air-fuel ratio (A/F)in of the exhaust gas is made temporarily rich. Therefore, in this case, the basic layer 53 plays the role of an absorbent for temporarily absorbing $NO_x$.

Note that, at this time, sometimes the basic layer 53 temporarily adsorbs the $NO_x$. Therefore, if using term of storage as a term including both absorption and adsorption, at this time, the basic layer 53 performs the role of an $NO_x$ storage agent for temporarily storing the $NO_x$. That is, in this case, if the ratio of the air and fuel (hydrocarbons) which are supplied into the engine intake passage, combustion chambers 2, and exhaust passage upstream of the exhaust purification catalyst 13 is referred to as the air-fuel ratio of the exhaust gas, the exhaust purification catalyst 13 functions as an $NO_x$ storage catalyst which stores the $NO_x$ when the air-fuel ratio of the exhaust gas is lean and releases the stored $NO_x$ when the oxygen concentration in the exhaust gas falls.

Figure 9:
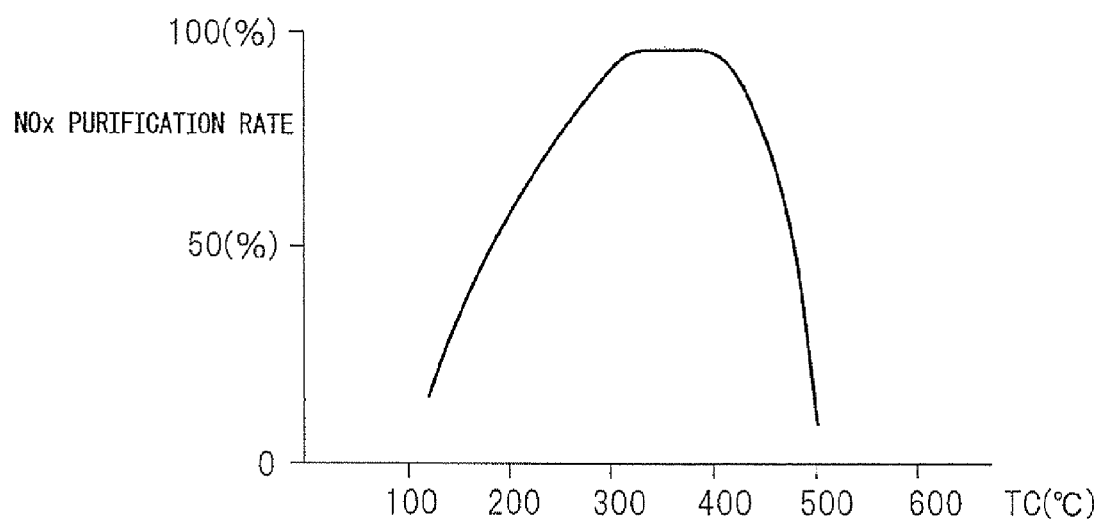
FIG. 9 is a view of an $NO_x$ purification rate.

FIG. 9 shows the $NO_x$ purification rate when making the exhaust purification catalyst 13 function as an $NO_x$ storage catalyst in this way. Note that, the abscissa of the FIG. 9 shows the catalyst temperature TC of the exhaust purification catalyst 13. When making the exhaust purification catalyst 13 function as an $NO_x$ storage catalyst, as shown in FIG. 9, when the catalyst temperature TC is 300° C. to 400° C., an extremely high $NO_x$ purification rate is obtained, but when the catalyst temperature TC becomes a 400° C. or higher high temperature, the $NO_x$ purification rate falls.

In this way, when the catalyst temperature TC becomes 400° C. or more, the $NO_x$ purification rate falls because if the catalyst temperature TC becomes 400° C. or more, the nitrates break down by heat and are released in the form of $NO_2$ from the exhaust purification catalyst 13. That is, so long as storing $NO_x$ in the form of nitrates, when the catalyst temperature TC is high, it is difficult to obtain a high $NO_x$ purification rate. However, in the new $NO_x$ purification method shown from FIG. 4 to FIGS. 6A and 6B, as will be understood from FIGS. 6A and 6B, nitrates are not formed or even if formed are extremely small in amount, consequently, as shown in FIG. 5, even when the catalyst temperature TC is high, a high $NO_x$ purification rate is obtained.

Therefore, in an embodiment of the present invention, a hydrocarbon feed valve 15 for feeding hydrocarbons is arranged in the engine exhaust passage, an exhaust purification catalyst 13 for reacting $NO_x$ contained in exhaust gas and reformed hydrocarbons is arranged in the engine exhaust passage downstream of the hydrocarbon feed valve 15, precious metal catalysts 51 and 52 are carried on the exhaust gas flow surface of the exhaust purification catalyst 13, a basic exhaust gas flow surface part 54 is formed around the precious metal catalysts 51 and 52, the exhaust purification catalyst 13 has the property of reducing the $NO_x$ which is contained in exhaust gas if the concentration of hydrocarbons which flow into the exhaust purification catalyst 13 is made to vibrate by within a predetermined range of amplitude and within a predetermined range of period and has the property of being increased in storage amount of $NO_x$ which is contained in exhaust gas if the vibration period of the hydrocarbon concentration is made longer than this predetermined range, and, at the time of engine operation, the concentration of hydrocarbons which flow into the exhaust purification catalyst 13 is made to vibrate by within the predetermined range of amplitude and within the predetermined range of period to thereby reduce the $NO_x$ which is contained in the exhaust gas in the exhaust purification catalyst 13.

That is, the $NO_x$ purification method which is shown from FIG. 4 to FIGS. 6A and 6B can be said to be a new $NO_x$ purification method designed to remove $NO_x$ without forming almost any nitrates in the case of using an exhaust purification catalyst which carries precious metal catalysts and forms a basic layer which can absorb $NO_x$. In actuality, when using this new $NO_x$ purification method, the nitrates which are detected from the basic layer 53 become much smaller in amount compared with the case where making the exhaust purification catalyst 13 function as an $NO_x$ storage catalyst. Note that, this new $NO_x$ purification method will be referred to below as the first $NO_x$ purification method.

Next, referring to FIG. 10 to FIG. 15, this first $NO_x$ purification method will be explained in a bit more detail.

Figure 10:
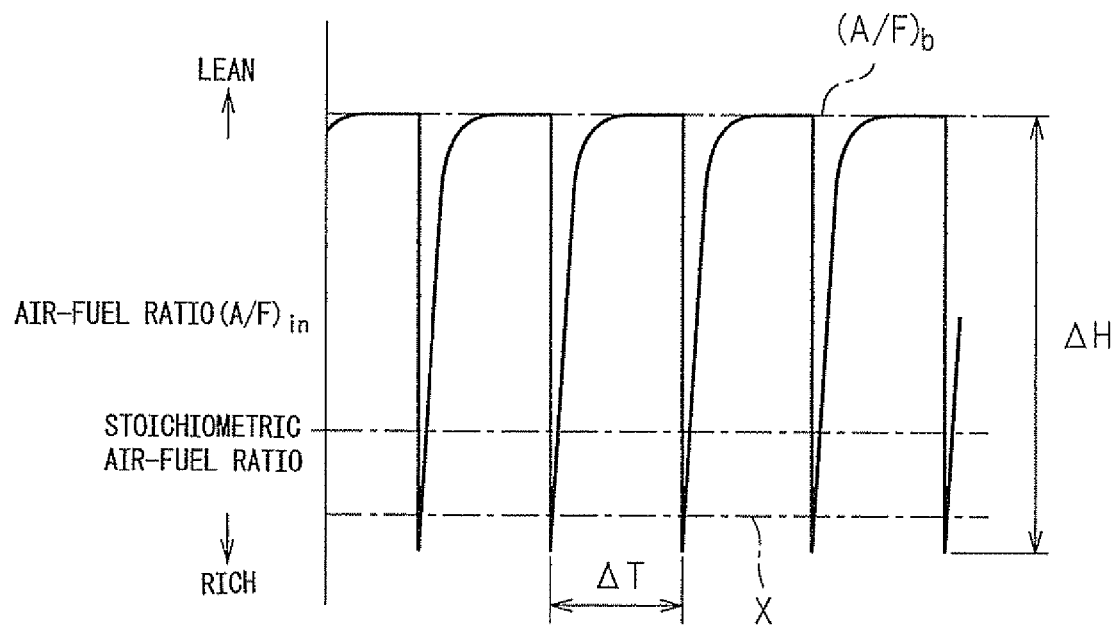
FIG. 10 is a time chart which shows a change of an air-fuel ratio of exhaust gas flowing into an exhaust purification catalyst.

FIG. 10 shows enlarged the change in the air-fuel ratio (A/F)in shown in FIG. 4. Note that, as explained above, the change in the air-fuel ratio (A/F)in of the exhaust gas which flows into this exhaust purification catalyst 13 simultaneously shows the change in concentration of the hydrocarbons which flow into the exhaust purification catalyst 13. Note that, in FIG. 10, ΔH shows the amplitude of the change in concentration of hydrocarbons HC which flow into the exhaust purification catalyst 13, while ΔT shows the vibration period of the concentration of the hydrocarbons which flow into the exhaust purification catalyst 13.

Furthermore, in FIG. 10, (A/F)b shows the base air-fuel ratio which shows the air-fuel ratio of the combustion gas for generating the engine output. In other words, this base air-fuel ratio (A/F)b shows the air-fuel ratio of the exhaust gas which flows into the exhaust purification catalyst 13 when stopping the feed of hydrocarbons. On the other hand, in FIG. 10, X shows the upper limit of the air-fuel ratio (A/F)in used for producing the reducing intermediate without the produced active $NO_x$* being stored in the form of nitrates inside the basic layer 53 much at all. To make the active $NO_x$* and the reformed hydrocarbons react to produce a reducing intermediate, the air-fuel ratio (A/F)in has to be made lower than this upper limit X of the air-fuel ratio.

In other words, in FIG. 10, X shows the lower limit of the concentration of hydrocarbons required for making the active $NO_x$* and reformed hydrocarbons react to produce a reducing intermediate. To produce the reducing intermediate, the concentration of hydrocarbons has to be made higher than this lower limit X. In this case, whether the reducing intermediate is produced is determined by the ratio of the oxygen concentration and hydrocarbon concentration around the active $NO_x$*, that is, the air-fuel ratio (A/F)in. The upper limit X of the air-fuel ratio required for producing the reducing intermediate will below be called the demanded minimum air-fuel ratio.

In the example shown in FIG. 10, the demanded minimum air-fuel ratio X is rich, therefore, in this case, to form the reducing intermediate, the air-fuel ratio (A/F)in is instantaneously made the demanded minimum air-fuel ratio X or less, that is, rich. As opposed to this, in the example shown in FIG. 11, the demanded minimum air-fuel ratio X is lean. In this case, the air-fuel ratio (A/F)in is maintained lean while periodically reducing the air-fuel ratio (A/F)in so as to form the reducing intermediate.

In this case, whether the demanded minimum air-fuel ratio X becomes rich or becomes lean depends on the oxidizing strength of the exhaust purification catalyst 13. In this case, the exhaust purification catalyst 13, for example, becomes stronger in oxidizing strength if increasing the carried amount of the precious metal 51 and becomes stronger in oxidizing strength if strengthening the acidity. Therefore, the oxidizing strength of the exhaust purification catalyst 13 changes due to the carried amount of the precious metal 51 or the strength of the acidity.

Figure 11:
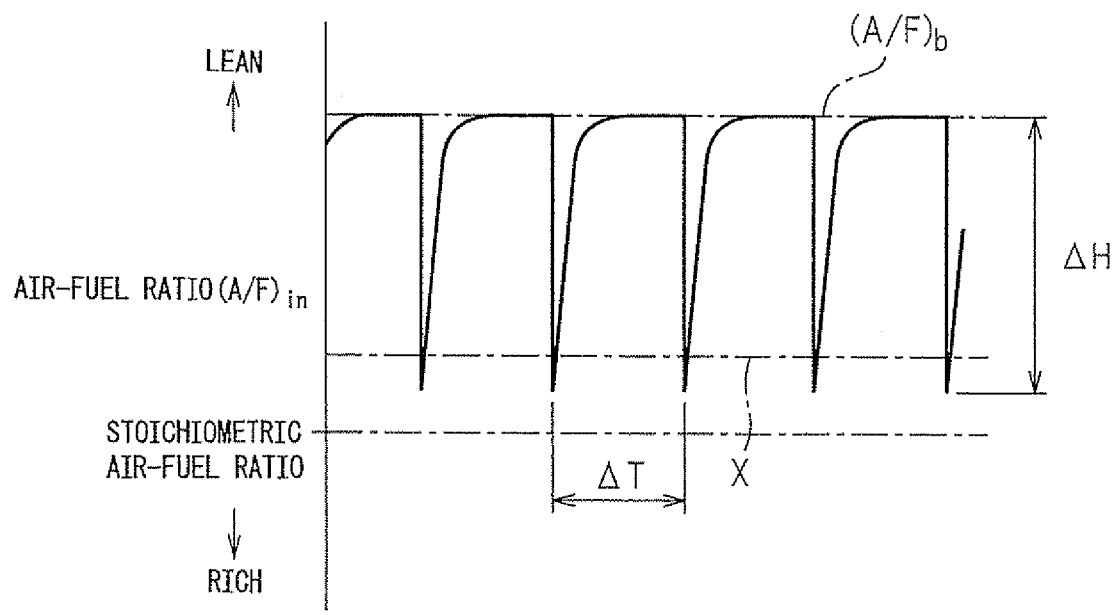
FIG. 11 is a time chart which shows a change of an air-fuel ratio of exhaust gas flowing into an exhaust purification catalyst.

Now, if using an exhaust purification catalyst 13 with a strong oxidizing strength, as shown in FIG. 11, if maintaining the air-fuel ratio (A/F)in lean while periodically lowering the air-fuel ratio (A/F)in, the hydrocarbons end up becoming completely oxidized when the air-fuel ratio (A/F)in is reduced. As a result, a reducing intermediate can no longer be produced. As opposed to this, when using an exhaust purification catalyst 13 with a strong oxidizing strength, as shown in FIG. 10, if making the air-fuel ratio (A/F)in periodically rich, when the air-fuel ratio (A/F)in is made rich, part of the hydrocarbons will not be completely oxidized, but will be partially oxidized, that is, the hydrocarbons will be reformed, consequently a reducing intermediate will be produced. Therefore, when using an exhaust purification catalyst 13 with a strong oxidizing strength, the demanded minimum air-fuel ratio X has to be made rich.

On the other hand, when using an exhaust purification catalyst 13 with a weak oxidizing strength, as shown in FIG. 11, if maintaining the air-fuel ratio (A/F)in lean while periodically lowering the air-fuel ratio (A/F)in, part of the hydrocarbons will not be completely oxidized, but will be partially oxidized, that is, the hydrocarbons will be reformed, and consequently a reducing intermediate will be produced. As opposed to this, when using an exhaust purification catalyst 13 with a weak oxidizing strength, as shown in FIG. 10, if making the air-fuel ratio (A/F)in periodically rich, a large amount of hydrocarbons will be exhausted from the exhaust purification catalyst 13 without being oxidized and consequently the amount of hydrocarbons which is wastefully consumed will increase. Therefore, when using an exhaust purification catalyst 13 with a weak oxidizing strength, the demanded minimum air-fuel ratio X has to be made lean.

Figure 12:
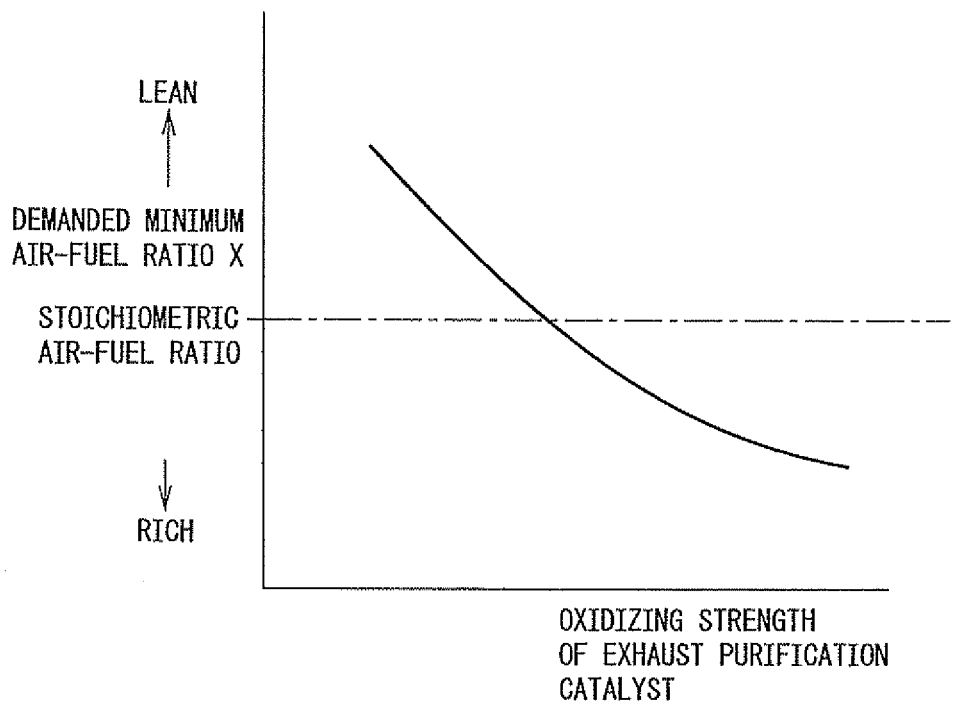
FIG. 12 is a view which shows a relationship between an oxidizing strength of an exhaust purification catalyst and a requested minimum air-fuel ratio X.

That is, it is learned that the demanded minimum air-fuel ratio X, as shown in FIG. 12, has to be reduced the stronger the oxidizing strength of the exhaust purification catalyst 13. In this way the demanded minimum air-fuel ratio X becomes lean or rich due to the oxidizing strength of the exhaust purification catalyst 13. Below, taking as example the case where the demanded minimum air-fuel ratio X is rich, the amplitude of the change in concentration of hydrocarbons which flow into the exhaust purification catalyst 13 and the vibration period of the concentration of hydrocarbons which flow into the exhaust purification catalyst 13 will be explained.

Now, if the base air-fuel ratio (A/F)b becomes larger, that is, if the oxygen concentration in the exhaust gas before the hydrocarbons are fed becomes higher, the feed amount of hydrocarbons required for making the air-fuel ratio (A/F)in the demanded minimum air-fuel ratio X or less increases and along with this the excess amount of hydrocarbons which do not contribute to the production of the reducing intermediate also increases. In this case, to remove the $NO_x$ well, as explained above, it is necessary to make the excess hydrocarbons oxidize. Therefore, to remove the $NO_x$ well, the larger the amount of excess hydrocarbons, the larger the amount of oxygen which is required.

In this case, if raising the oxygen concentration in the exhaust gas, the amount of oxygen can be increased. Therefore, to remove the $NO_x$ well, when the oxygen concentration in the exhaust gas before the hydrocarbons are fed is high, it is necessary to raise the oxygen concentration in the exhaust gas after feeding the hydrocarbons. That is, the higher the oxygen concentration in the exhaust gas before the hydrocarbons are fed, the larger the amplitude of the hydrocarbon concentration has to be made.

Figure 13:
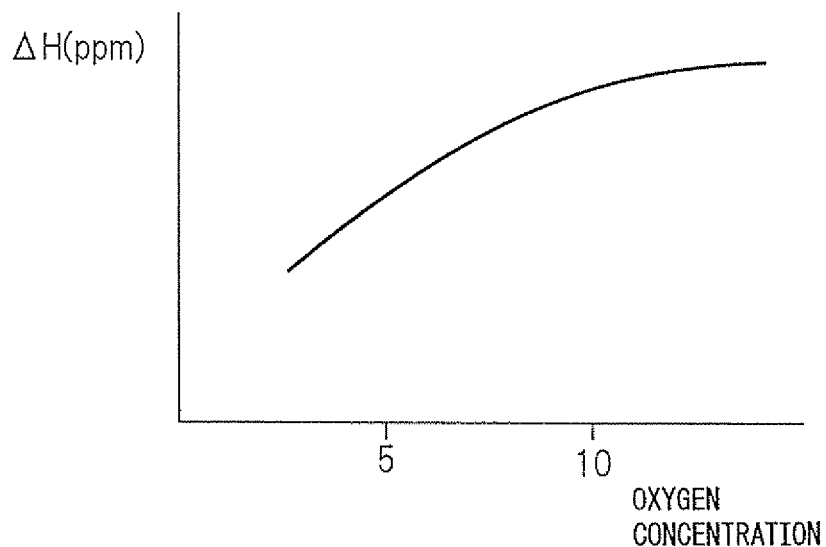
FIG. 13 is a view which shows a relationship between an oxygen concentration in exhaust gas and an amplitude $\Delta H$ of a hydrocarbon concentration giving the same $NO_x$ purification rate.

FIG. 13 shows the relationship between the oxygen concentration in the exhaust gas before the hydrocarbons are fed and the amplitude $\Delta H$ of the hydrocarbon concentration when the same $NO_x$ purification rate is obtained. To obtain the same $NO_x$ purification rate, from FIG. 13, it is learned that the higher the oxygen concentration in the exhaust gas before the hydrocarbons are fed, the greater the amplitude $\Delta H$ of the hydrocarbon concentration has to be made. That is, to obtain the same $NO_x$ purification rate, the higher the base air-fuel ratio (A/F)b, the greater the amplitude $\Delta T$ of the hydrocarbon concentration has to be made. In other words, to remove the $NO_x$ well, the lower the base air-fuel ratio (A/F)b, the more the amplitude $\Delta T$ of the hydrocarbon concentration can be reduced.

Figure 14:
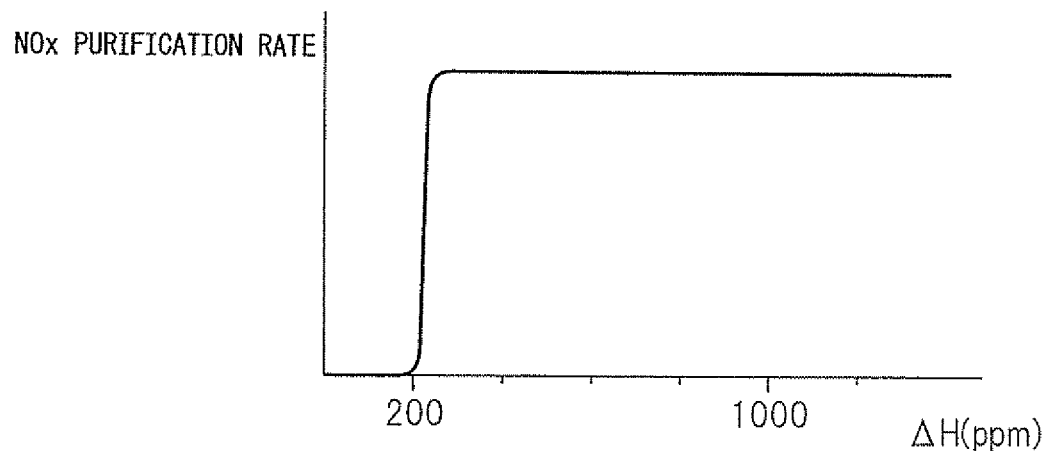
FIG. 14 is a view which shows a relationship between an amplitude $\Delta H$ of a hydrocarbon concentration and an $NO_x$ purification rate.

In this regard, the base air-fuel ratio (A/F)b becomes the lowest at the time of an acceleration operation. At this time, if the amplitude $\Delta H$ of the hydrocarbon concentration is about 200 ppm, it is possible to remove the $NO_x$ well. The base air-fuel ratio (A/F)b is normally larger than the time of acceleration operation. Therefore, as shown in FIG. 14, if the amplitude $\Delta H$ of the hydrocarbon concentration is 200 ppm or more, an excellent $NO_x$ purification rate can be obtained.

On the other hand, it is learned that when the base air-fuel ratio (A/F)b is the highest, if making the amplitude $\Delta H$ of the hydrocarbon concentration 10000 ppm or so, an excellent $NO_x$ purification rate is obtained. Therefore, in the present invention, the predetermined range of the amplitude of the hydrocarbon concentration is made 200 ppm to 10000 ppm.

Figure 15:
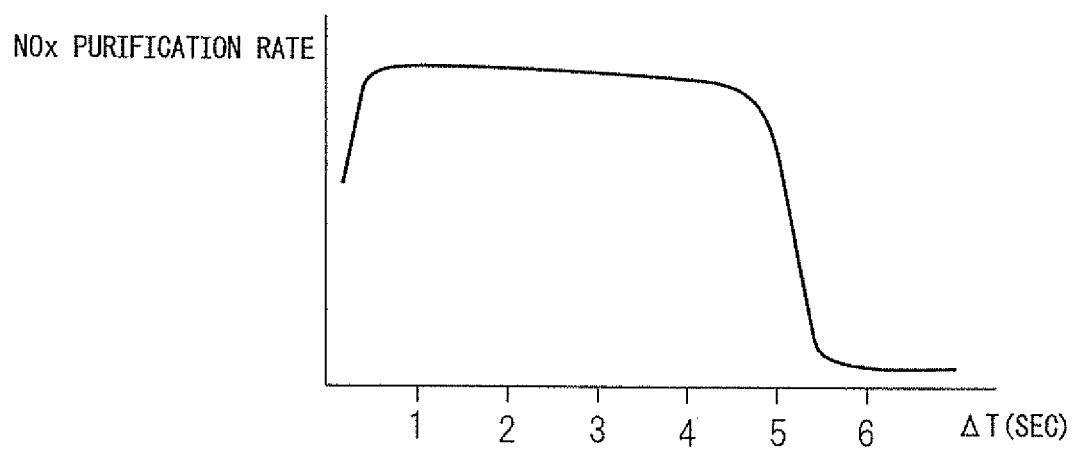
FIG. 15 is a view which shows a relationship of a vibration period $\Delta T$ of a hydrocarbon concentration and an $NO_x$ purification rate.

Further, if the vibration period $\Delta T$ of the hydrocarbon concentration becomes longer, the oxygen concentration around the active $NO_x^*$ becomes higher in the time period after the hydrocarbons are fed to when the hydrocarbons are next fed. In this case, if the vibration period $\Delta T$ of the hydrocarbon concentration becomes longer than about 5 seconds, the majority of the active $NO_x^*$ starts to be absorbed in the form of nitrates inside the basic layer 53. Therefore, as shown in FIG. 15, if the vibration period $\Delta T$ of the hydrocarbon concentration becomes longer than about 5 seconds, the $NO_x$ purification rate falls. Therefore, the vibration period $\Delta T$ of the hydrocarbon concentration has to be made 5 seconds or less.

On the other hand, if the vibration period $\Delta T$ of the hydrocarbon concentration becomes about 0.3 second or less, the fed hydrocarbons start to build up on the exhaust gas flow surface of the exhaust purification catalyst 13, therefore, as shown in FIG. 15, if the vibration period $\Delta T$ of the hydrocarbon concentration becomes about 0.3 second or less, the $NO_x$ purification rate falls. Therefore, in the present invention, the vibration period of the hydrocarbon concentration is made from 0.3 second to 5 seconds.

Next, referring to FIG. 16 to FIG. 19, an $NO_x$ purification method in the case when making the exhaust purification catalyst 13 function as an $NO_x$ storage catalyst will be explained in detail. The $NO_x$ purification method in the case when making the exhaust purification catalyst 13 function as an $NO_x$ storage catalyst in this way will be referred to below as the second $NO_x$ purification method.

Figure 16:
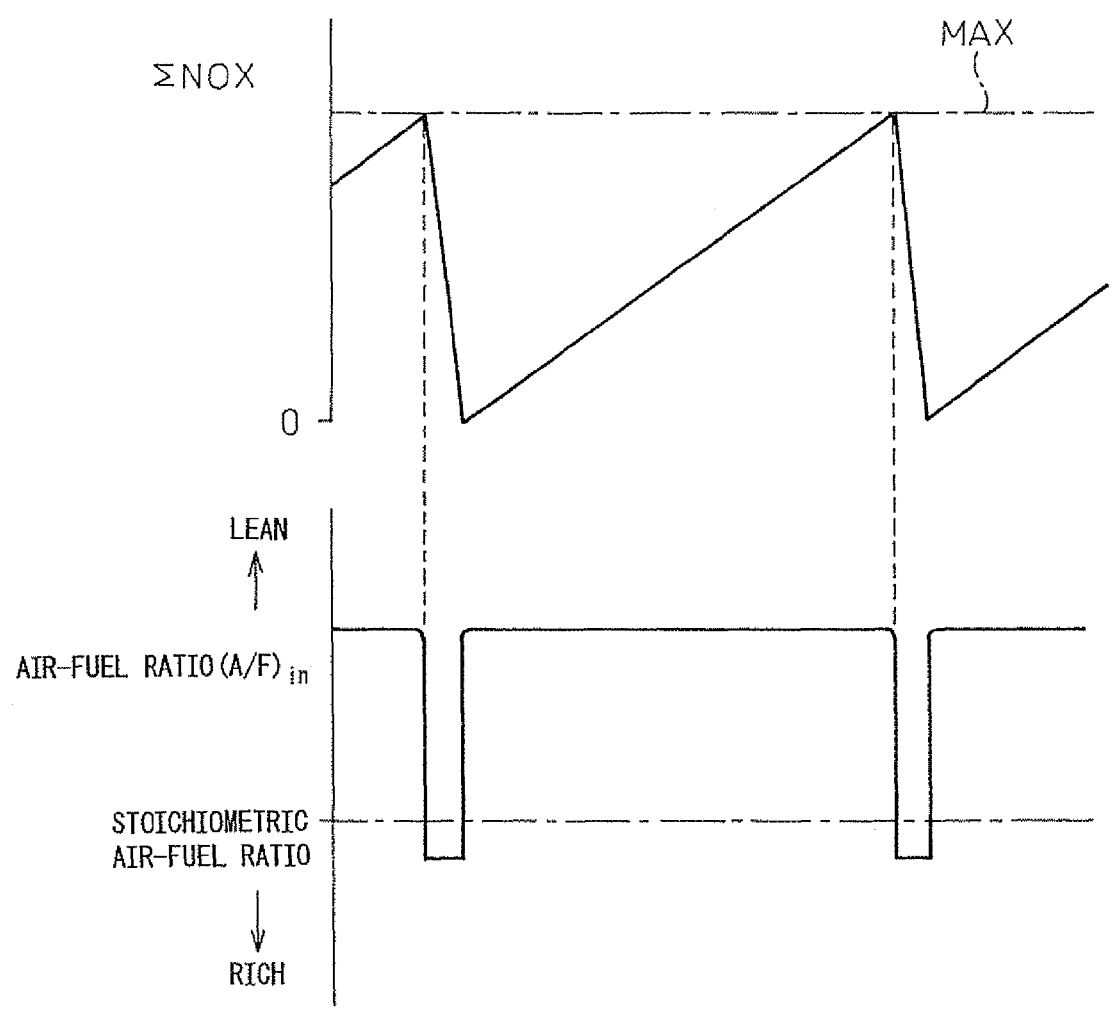
FIG. 16 is a view which shows a change in the air-fuel ratio of the exhaust gas which flows to the exhaust purification catalyst etc.

In this second $NO_x$ purification method, as shown in FIG. 16, when the stored $NO_x$ amount $\Sigma NOX$ of $NO_x$ which is stored in the basic layer 53 exceeds a predetermined allowable amount MAX, the air-fuel ratio (A/F)in of the exhaust gas flowing into the exhaust purification catalyst 13 is temporarily made rich. If the air-fuel ratio (A/F)in of the exhaust gas is made rich, the $NO_x$ which was stored in the basic layer 53 when the air-fuel ratio (A/F)in of the exhaust gas was lean is released from the basic layer 53 all at once and reduced. Due to this, the $NO_x$ is removed.

Figure 17:
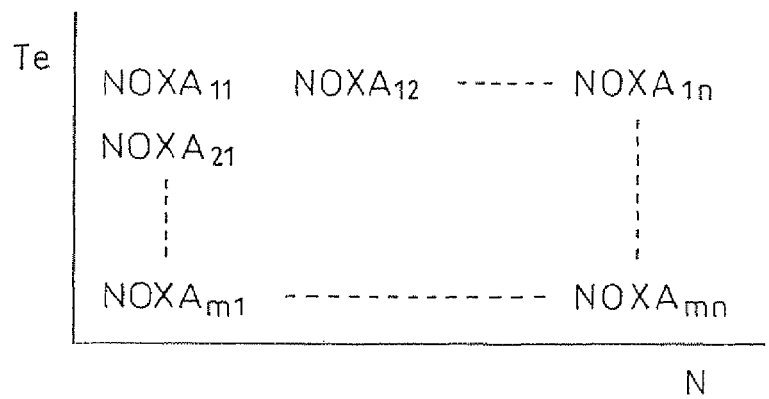
FIG. 17 is a view which shows a map of an exhausted $NO_x$ amount NOXA.

The stored $NO_x$ amount $\Sigma NOX$ is, for example, calculated from the amount of $NO_x$ which is exhausted from the engine. In this embodiment according to the present invention, the exhausted $NO_x$ amount NOXA of $NO_x$ which is exhausted from the engine per unit time is stored as a function of the engine output torque Te and engine speed N in the form of a map such as shown in FIG. 17 in advance in the ROM 32. The stored $NO_x$ amount $\Sigma NOX$ is calculated from the exhausted $NO_x$ amount NOXA. In this case, as explained before, the period during which the air-fuel ratio (A/F)in of the exhaust gas is made rich is usually 1 minute or more.

Figure 18:
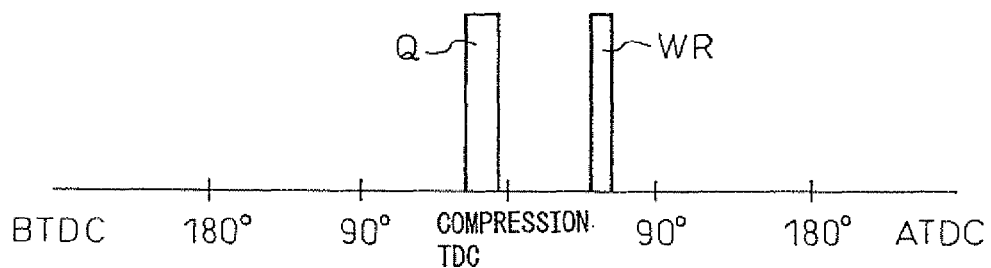
FIG. 18 is a view which shows a fuel injection timing.
Figure 19:
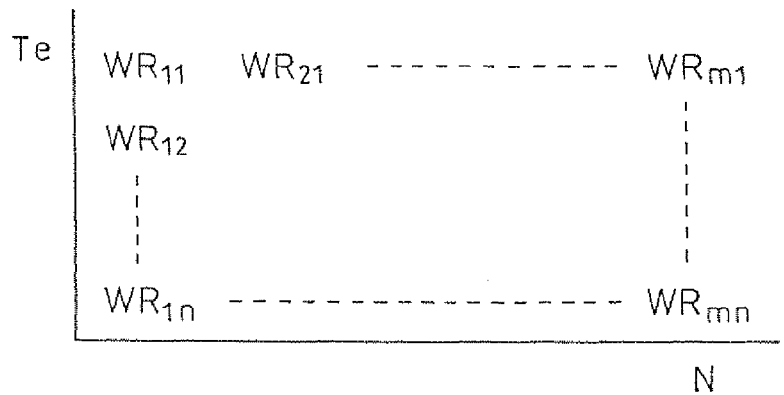
FIG. 19 is a view which shows a map of an additional fuel amount WR.

In this second $NO_x$ purification method, as shown in FIG. 18, the fuel injector 3 injects additional fuel WR into the combustion chamber 2 in addition to the output generation-use fuel Q so that the air-fuel ratio (A/F)in of the exhaust gas which flows into the exhaust purification catalyst 13 is made rich. Note that, in FIG. 18, the abscissa indicates the crank angle. This additional fuel WR is injected at a timing at which it will burn, but will not appear as engine output, that is, slightly before ATDC90° after compression top dead center. This fuel amount WR is stored as a function of the engine output torque Te and engine speed N in the form of a map such as shown in FIG. 19 in advance in the ROM 32. Of course, in this case, it is also possible to make the feed amount of hydrocarbons from the hydrocarbon feed valve 15 increase so as to make the air-fuel ratio (A/F)in of the exhaust gas rich.

Now, returning again to the explanation of the first $NO_x$ purification method, to use the first $NO_x$ purification method to remove the $NO_x$ well as explained before, the amplitude $\Delta H$ and vibration period $\Delta T$ of the hydrocarbon concentration have to be suitably controlled. That is, to use the first $NO_x$ purification method to remove the $NO_x$ well, it is necessary to control the amplitude $\Delta H$ of the hydrocarbon concentration so that the air-fuel ratio (A/F)in of the exhaust gas which flows into the exhaust purification catalyst 13 becomes the demanded minimum air-fuel ratio X or less, and it is necessary to control the vibration period $\Delta T$ of the hydrocarbon concentration to 0.3 second to 5 seconds.

In this case, in the present invention, the amplitude $\Delta H$ of the hydrocarbon concentration is controlled by controlling the injection amount of hydrocarbons from the hydrocarbon feed valve 15 and the vibration period $\Delta T$ of the hydrocarbon concentration is controlled by controlling the injection period of hydrocarbons from the hydrocarbon feed valve 15. In this case, the injection amount of hydrocarbons from the hydrocarbon feed valve 15 can be controlled by controlling at least one of the injection time or injection pressure of hydrocarbons from the hydrocarbon feed valve 15. However, below, the present invention will be explained with reference to the case of controlling the injection amount by controlling the injection time while holding the injection pressure constant.

Now then, in this embodiment according to the present invention, the optimal opening degree of the throttle valve 10 and the optimal opening degree of the EGR control valve 17 in accordance with the operating state of the engine are found in advance by experiments. Furthermore, the optimal base air-fuel ratio (A/F)b which is obtained when the throttle valve 10 and the EGR control valve 17 are made the optimal opening degrees is also found in advance by experiments. At the time of engine operation, the fuel injection amount from the fuel injector 3 is controlled so that the air-fuel ratio of the exhaust gas which is exhausted from the engine becomes this optimal base air-fuel ratio (A/F)b.

Further, the optimal hydrocarbon injection period $\Delta T$ and the optimal hydrocarbon injection period WT which give the highest $NO_x$ purification rate when the $NO_x$ purification action by the first $NO_x$ purification method is being performed are found in advance by experiments. This optimal hydrocarbon injection period $\Delta T$ is stored as a function of the engine speed N and the engine output torque Te in the form of a map such as shown in FIG. 20A in advance in the ROM 32, and this optimal hydrocarbon injection period WT is also stored as a function of the engine speed N and the engine output torque Te in the form of a map such as shown in FIG. 20B in advance in the ROM 32.

Figure 20A:
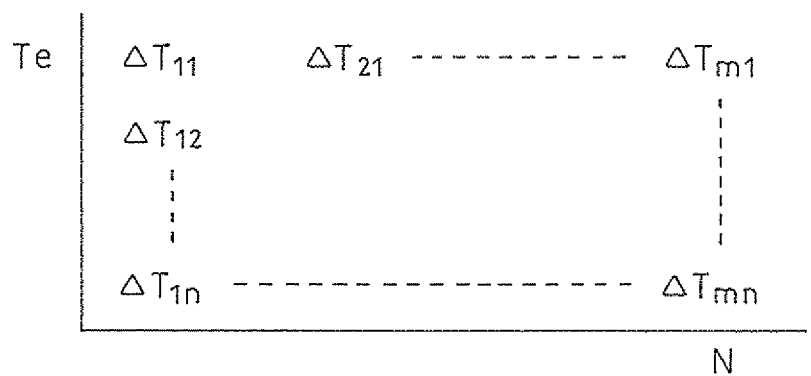
FIGS. 20A and 20B are views which show an injection period of hydrocarbons etc.
Figure 20B:
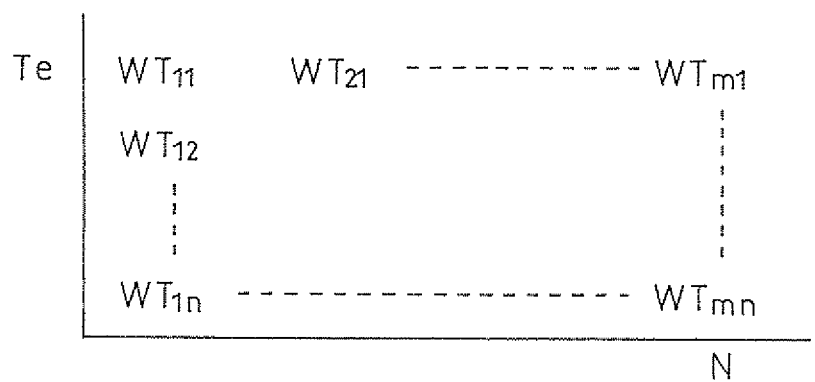
Figure 21A:
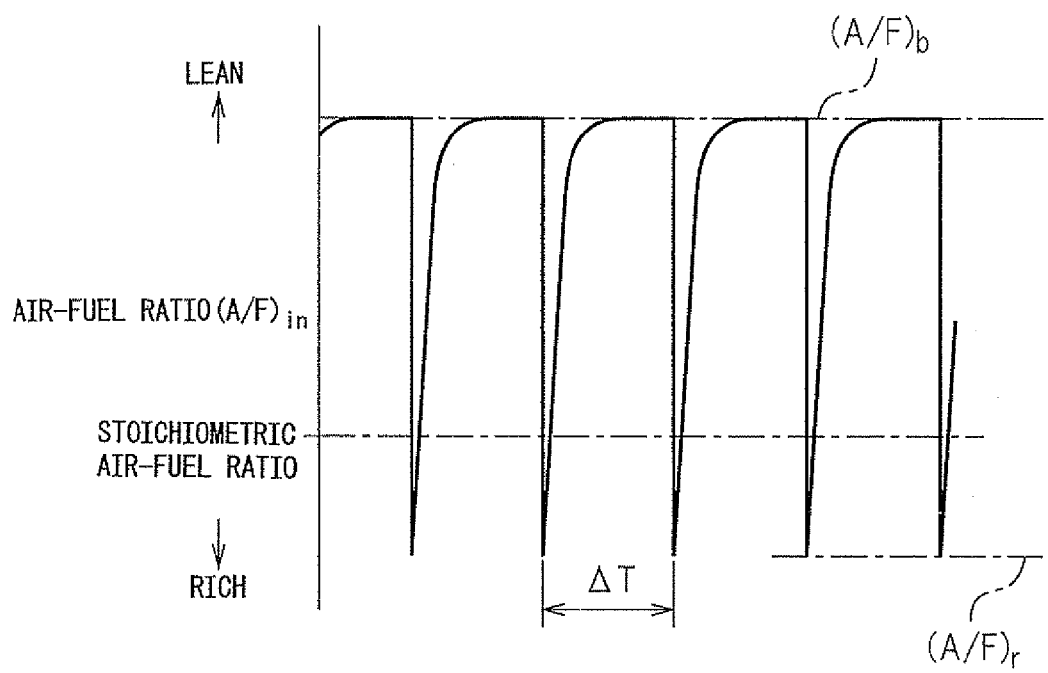
FIGS. 21A and 21B are time charts which show changes in an air-fuel ratio of exhaust gas which flows into an exhaust purification catalyst.
Figure 21B:
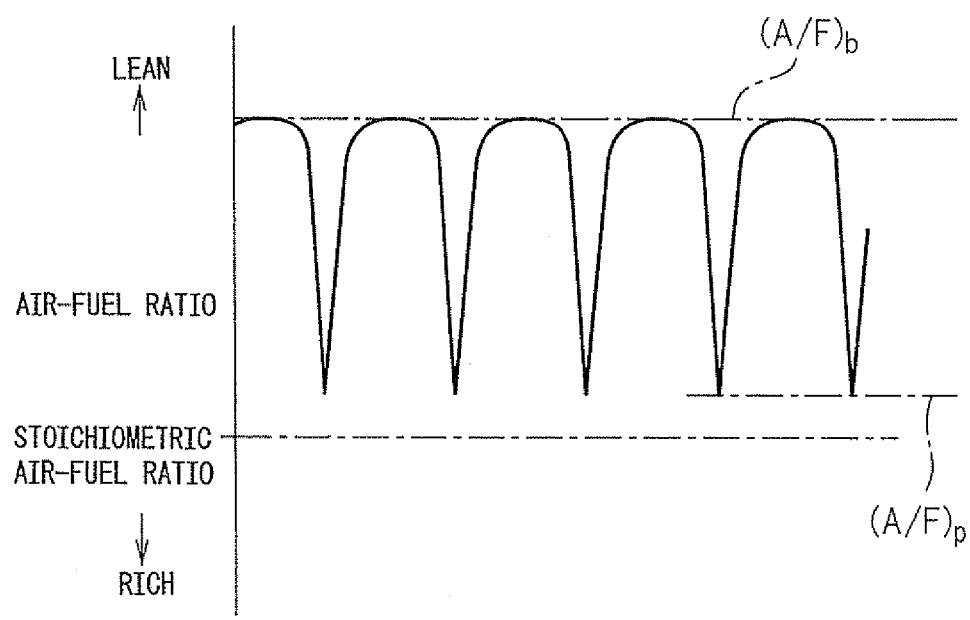

FIG. 21A shows the change of the air-fuel ratio (A/F)in of the exhaust gas which flows into the exhaust purification catalyst 13 when the hydrocarbon injection period is made the optimal hydrocarbon injection period $\Delta T$ which is shown in FIG. 20A and the hydrocarbon injection period is made the optimal hydrocarbon injection period WT which is shown in FIG. 20B, while FIG. 21B shows the change of the air-fuel ratio which is detected by the downstream side air-fuel ratio sensor 24 at this time. As will be understood from FIG. 21A and FIG. 21B, a rich side peak air-fuel ratio (A/F)p of the air-fuel ratio (A/F)in of the exhaust gas which flows into the exhaust purification catalyst 13 is rich, while the rich side peak air-fuel ratio (A/F)p of the air-fuel ratio which is detected by the downstream side air-fuel ratio sensor 24 is lean. This is considered to be because part of the fed hydrocarbons deposits once on the exhaust purification catalyst 13, then evaporates with a time difference, whereby the change in the air-fuel ratio of the exhaust gas which flows out from the exhaust purification catalyst 13 is smoothed, so the peak value of the air-fuel ratio becomes smaller.

Figure 22A:
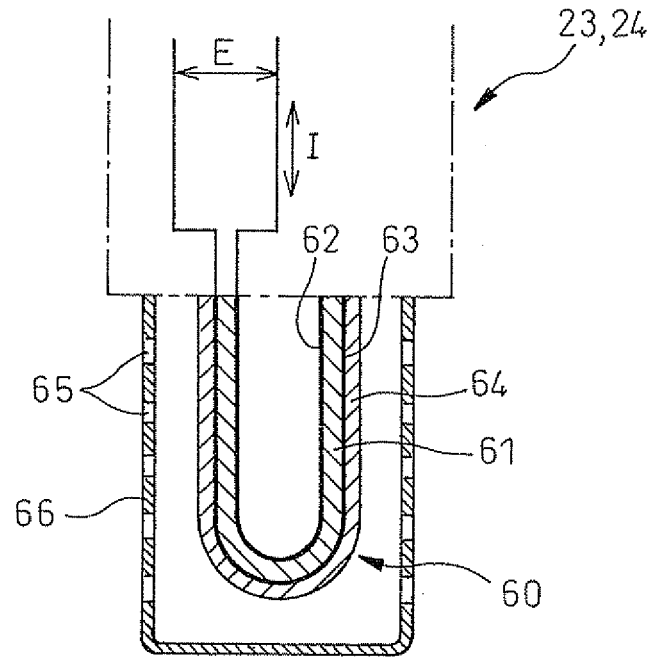
FIGS. 22A and 22B is views which show the structure of an air-fuel ratio sensor shown schematically etc.

Next, the structures of the upstream side air-fuel ratio sensor 23 and the downstream side air-fuel ratio sensor 24 which are used in the present invention will be simply explained. Note that, these upstream side air-fuel ratio sensor 23 and downstream side air-fuel ratio sensor 24 have the same structure. FIG. 22A schematically shows the structures of the air-fuel ratio sensors 23 and 24.

Figure 22B:
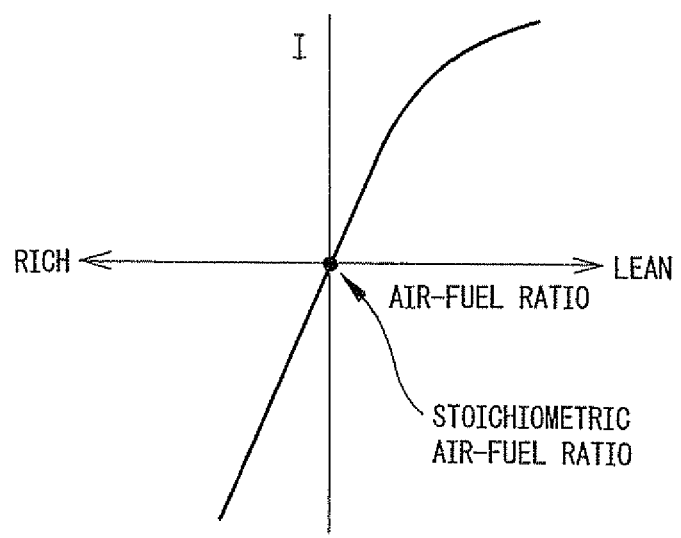

Referring to FIG. 22A, the sensor part 60 of each of the air-fuel ratio sensors 23 and 24 is comprised of a thin walled cup-shaped solid electrolyte 61 made of zirconia Zr, a platinum thin film electrode 62 which covers the inner circumference of the solid electrolyte 61, a platinum thin film electrode 63 which covers the outer circumference of the solid electrolyte 61, and a diffusion resistance layer 64 which is comprised of alumina which covers the surroundings of the electrode 63. This sensor part 60 is covered by a protective cover 66 which has a large number of holes 65. This sensor part 60 is arranged in the exhaust gas. The exhaust gas passes through the holes 65 and is guided to the top of the diffusion resistance layer 64. As shown in FIG. 22A, a constant voltage E is applied across the electrodes 62 and 63. At this time, a current I flows between the electrodes 62 and 63 in accordance with the air-fuel ratio of the exhaust gas as shown in FIG. 22B. In the present invention, the air-fuel ratio is found from this current value I based on the relationship which is shown in FIG. 22B. That is, the air-fuel ratio is detected from the outputs of the air-fuel ratio sensors 23 and 24.

In this regard, exhaust gas contains $SO_x$. In this case, the air-fuel ratio sensors 23 and 24 are believed to be affected by this $SO_x$. However, how the air-fuel ratios which are detected by the air-fuel ratio sensors 23 and 24 are affected by the $SO_x$ which is contained in this exhaust gas has not been known at all up to now. Therefore, the inventors studied how the air-fuel ratios which are detected by the air-fuel ratio sensors 23 and 24 are affected by the $SO_x$ which is contained in exhaust gas and as a result discovered a relationship between the air-fuel ratios which are detected by the air-fuel ratio sensors 23 and 24 and sulfur poisoning of the air-fuel ratio sensors 23 and 24.

Figure 23A:
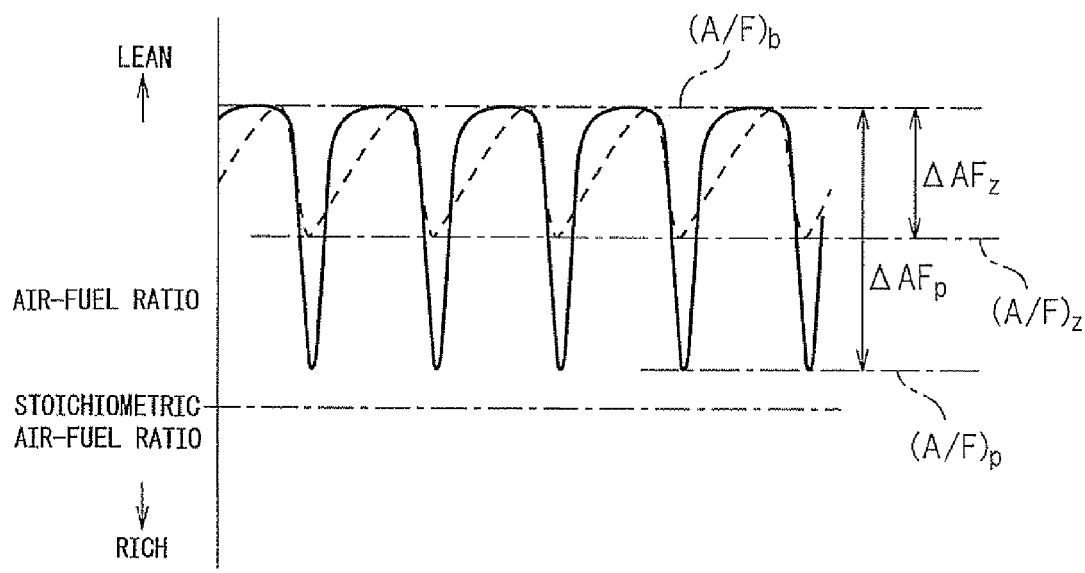
FIGS. 23A and 23B are views which show changes in an air-fuel ratio which is detected by a downstream side air-fuel ratio sensor etc.

Next, this will be explained with reference to the example of the downstream side air-fuel ratio sensor 24. The solid line in FIG. 23A shows as is the change in the air-fuel ratio which is detected by the downstream side air-fuel ratio sensor 24 which is shown in FIG. 21A. That is, the solid line of FIG. 23A shows the change in the air-fuel ratio which is detected by the downstream side air-fuel ratio sensor 24 when the downstream side air-fuel ratio sensor 24 is not poisoned by sulfur. In this regard, it was learned that if sulfur ingredients deposit at the downstream side air-fuel ratio sensor 24, the greater the amount of deposition of the sulfur ingredients at the downstream side air-fuel ratio sensor 24, as shown by the broken line in FIG. 23A, the smaller the amount of change of the air-fuel ratio which is detected by the downstream side air-fuel ratio sensor 24 and the longer the time period of change of the air-fuel ratio.

The reason is believed to be as follows: That is, in the air-fuel ratio sensor which is shown in FIG. 22A, the oxygen and hydrocarbons which are contained in the exhaust gas diffuse inside of the diffusion resistance layer 64 to reach the electrode 63, an oxidation action of hydrocarbons is performed on the electrode 63, and, if oxygen rich at this time, the oxygen ions move within the solid electrolyte 61 from the electrode 63 to 62, while if oxygen poor, the oxygen ions move within the solid electrolyte 61 from the electrode 62 to 63, and a current I generated due to this is used to detect the air-fuel ratio.

In this regard, if the exhaust gas contains $SO_x$, this $SO_x$ will also penetrate inside the diffusion resistance layer 64. On the one hand, this $SO_x$ will react with the platinum on the electrode 63 to form PtS, while on the other hand this $SO_x$ will be adsorbed on the alumina in the form of $SO_2$ or in the form of sulfate ions inside of the diffusion resistance layer 64. If PtS is formed on the electrode 63, the oxidation rate of the hydrocarbons on the electrode 63 is made to decrease, so the current value I slowly changes over a long time period. Further, if $SO_x$ is adsorbed at the alumina, the pores inside the diffusion resistance layer 64 will be closed, so large molecular weight hydrocarbons will take time until diffusing to the electrode 63. Therefore, due to this as well, the current value I will change slowly over a long time period. Therefore, if the downstream side air-fuel ratio sensor 24 is poisoned by sulfur, the amount of change of the air-fuel ratio which is detected by the downstream side air-fuel ratio sensor 24 will become smaller and the time period of change of the air-fuel ratio will become longer.

In this case, the more the amount of deposition of the sulfur ingredients at the downstream side air-fuel ratio sensor 24 increases, the smaller the amount of change of the air-fuel ratio which is detected by the downstream side air-fuel ratio sensor 24 will become and the longer the time period of change of the air-fuel ratio will become along with this, so it becomes possible to detect the amount of sulfur poisoning of the downstream side air-fuel ratio sensor 24 from the change of the air-fuel ratio which is detected by the downstream side air-fuel ratio sensor 24. This same is true for the upstream side air-fuel ratio sensor 23.

Therefore, in the present invention, each of the air-fuel ratio sensors 23 and 24 is a type of sensor which has a solid electrolyte 61, electrodes 62 and 63 respectively covering the two side surfaces of the solid electrolyte 61, and a diffusion resistance layer 64 covering one of electrodes 63 and in which the exhaust gas is guided on to this diffusion resistance layer 64. When the air-fuel ratio of the exhaust gas changes and the air-fuel ratios which are detected by the air-fuel ratio sensors 23 and 24 change, the changes of the air-fuel ratios which are detected by the air-fuel ratio sensors 23 and 24 are governed by the amounts of deposition of the sulfur ingredients at the air-fuel ratio sensors 23 and 24. At this time, the larger the amounts of deposition of the sulfur ingredients at the air-fuel ratio sensors 23 and 24 becomes, the smaller the changes of the air-fuel ratios detected by the air-fuel ratio sensors 23 and 24 and the longer the time periods of change of the air-fuel ratios become. The amounts of sulfur poisoning of the air-fuel ratio sensors 23 and 24 are detected from the changes of the air-fuel ratios which are detected by the air-fuel ratio sensors 23 and 24 at this time.

Next, the specific method of detection of the amounts of sulfur poisoning of air-fuel ratio sensors 23 and 24 will be explained with reference again to the example of the downstream side air-fuel ratio sensor 24. As shown in FIG. 23A by the broken line, if the downstream side air-fuel ratio sensor 24 is poisoned by sulfur, the rich side peak air-fuel ratio of the air-fuel ratio which is detected by the downstream side air-fuel ratio sensor 24 changes from (A/F)p to (A/F)z. That is, if the downstream side air-fuel ratio sensor 24 is poisoned by sulfur, the amount of change of the air-fuel ratio with respect to the base air-fuel ratio (A/F)b decreases from $\Delta AFp$ to $\Delta AFz$. Therefore, in one embodiment according to the present invention, the amount of sulfur poisoning of the downstream side air-fuel ratio sensor 24 is detected from the rich side peak air-fuel ratio of the air-fuel ratio which is detected by the downstream side air-fuel ratio sensor 24 or from the amount of change of the air-fuel ratio with respect to the base air-fuel ratio (A/F)b.

Figure 23B:
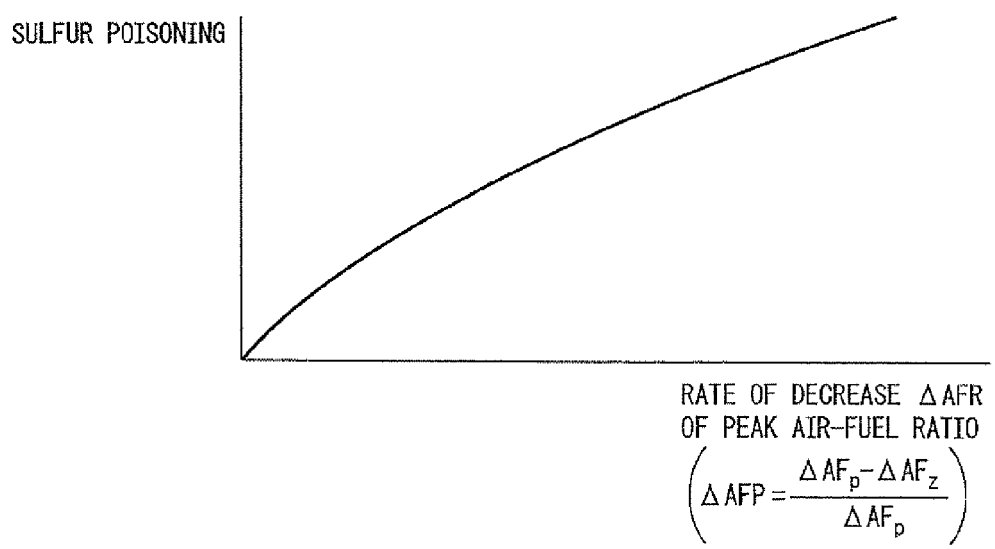
Figure 24:
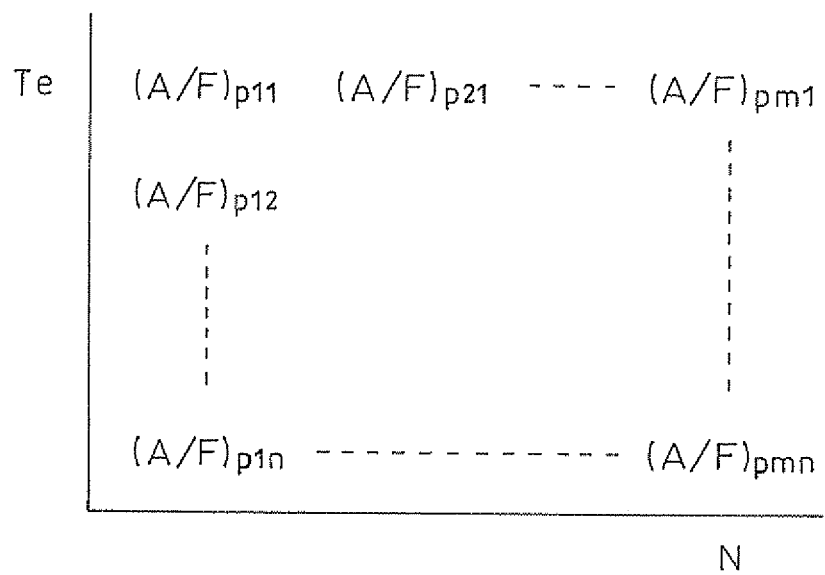
FIG. 24 is a view which shows a map of a peak air-fuel ratio.

FIG. 23B shows the relationship between the rate of decrease $\Delta AFR$ of the rich side peak air-fuel ratio of the air-fuel ratio which is detected by the downstream side air-fuel ratio sensor 24 and the amount of sulfur poisoning. Note that, the rate of decrease $\Delta AFR$ of this peak air-fuel ratio is expressed by the following formula $\Delta AFR = (\Delta AFp - \Delta AFz)/\Delta AFp$ where $\Delta AFp = (A/F)b - (A/F)p$ $\Delta AFz = (A/F)b - (A/F)z$ In the above formula, the base air-fuel ratio (A/F)b is determined in accordance with the operating state of the engine if determined. On the other hand, the rich side peak air-fuel ratio (A/F)p which is detected by the downstream side air-fuel ratio sensor 24 when the downstream side air-fuel ratio sensor 24 is not poisoned by sulfur is found in advance by experiments. This rich side peak air-fuel ratio (A/F)p which is found in advance by experiments is stored as a function of the engine speed N and the engine output torque Te in the form of a map such as shown in FIG. 24 in advance in the ROM 32. Therefore, $\Delta AFp$ is determined in accordance with the operating state of the engine if determined.

On the other hand, the rich side peak air-fuel ratio (A/F)z is a value which is detected by the downstream side air-fuel ratio sensor 24. $\Delta AFz$ is calculated from this detected rich side peak air-fuel ratio (A/F)z and the base air-fuel ratio (A/F)b which is determined from the operating state of the engine. That is, the rate of decrease $\Delta AFR$ of the peak air-fuel ratio is calculated from the rich side peak air-fuel ratio (A/F)z which is detected by the downstream side air-fuel ratio sensor 24. As shown in FIG. 23B, the more the rate of decrease $\Delta AFR$ of the peak air-fuel ratio increases, the larger the amount of sulfur poisoning of the downstream side air-fuel ratio sensor 24 becomes.

Figure 25:
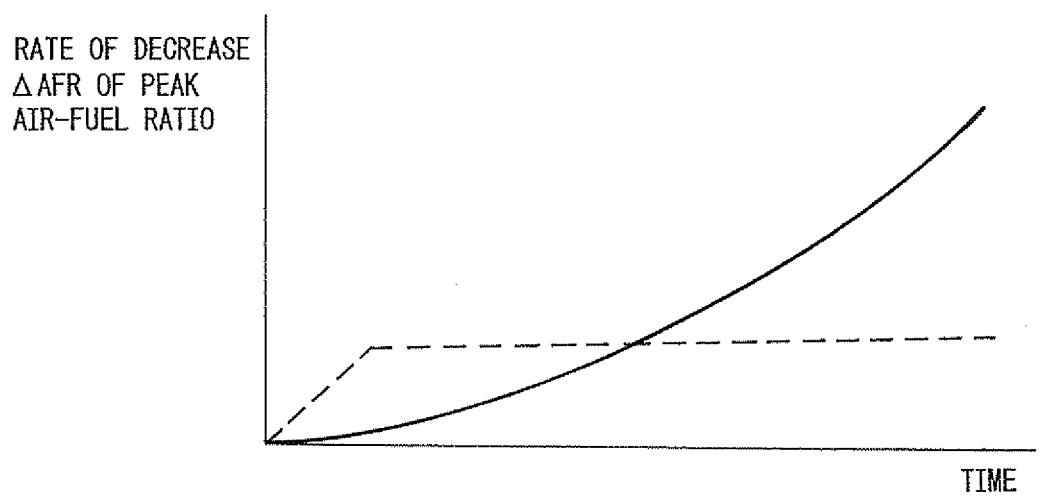
FIG. 25 is a time chart which shows changes in a rate of drop of the peak air-fuel ratio.

Now then, if the exhaust gas contains sulfur, as shown by the solid line FIG. 25, along with the elapse of time, the rate of decrease $\Delta AFR$ of the peak air-fuel ratio gradually becomes larger. On the other hand, even if the hydrocarbon feed valve 15 becomes clogged and the feed amount of hydrocarbons falls, the rich side peak air-fuel ratio (A/F)z which is detected by the downstream side air-fuel ratio sensor 24 becomes larger and as a result the rate of decrease $\Delta AFR$ of the peak air-fuel ratio increases. However, clogging of the hydrocarbon feed valve 15 occurs relatively rapidly. Once clogging occurs, as shown by the broken line in FIG. 25, the ratio will no longer change that much, so if continuously monitoring the change along with time of the rate of decrease $\Delta AFR$ of the peak air-fuel ratio, it can be judged if sulfur poisoning of the downstream side air-fuel ratio sensor 24 caused the rate of decrease $\Delta AFR$ of the peak air-fuel ratio to become larger or clogging of the hydrocarbon feed valve 15 caused the rate of decrease $\Delta AFR$ of the peak air-fuel ratio to become larger.

Therefore, in the embodiment according to the present invention, it is judged that the downstream side air-fuel ratio sensor 24 has been poisoned by sulfur or that the hydrocarbon feed valve 15 has become clogged from the change along with time of the rate of decrease $\Delta AFR$ of the peak air-fuel ratio, that is, from the change of the air-fuel ratio which is detected by the downstream side air-fuel ratio sensor 24.

Next, referring to FIG. 26A, another embodiment will be explained. In this embodiment, the amount of sulfur poisoning of the downstream side air-fuel ratio sensor 24 is found from the integrated value of the difference between the air-fuel ratio detected by the downstream side air-fuel ratio sensor 24 and the base air-fuel ratio (A/F)b. That is, when hydrocarbons are injected one time from the hydrocarbon feed valve 15 and the air-fuel ratio of the exhaust gas which flows into the exhaust purification catalyst 13 instantaneously changes, if the downstream side air-fuel ratio sensor 24 is not poisoned by sulfur, as shown in FIG. 26A by the solid line, the air-fuel ratio which is detected by the downstream side air-fuel ratio sensor 24 finishes changing instantaneously within a predetermined time period which is shown by A in FIG. 26A.

Figure 26A:
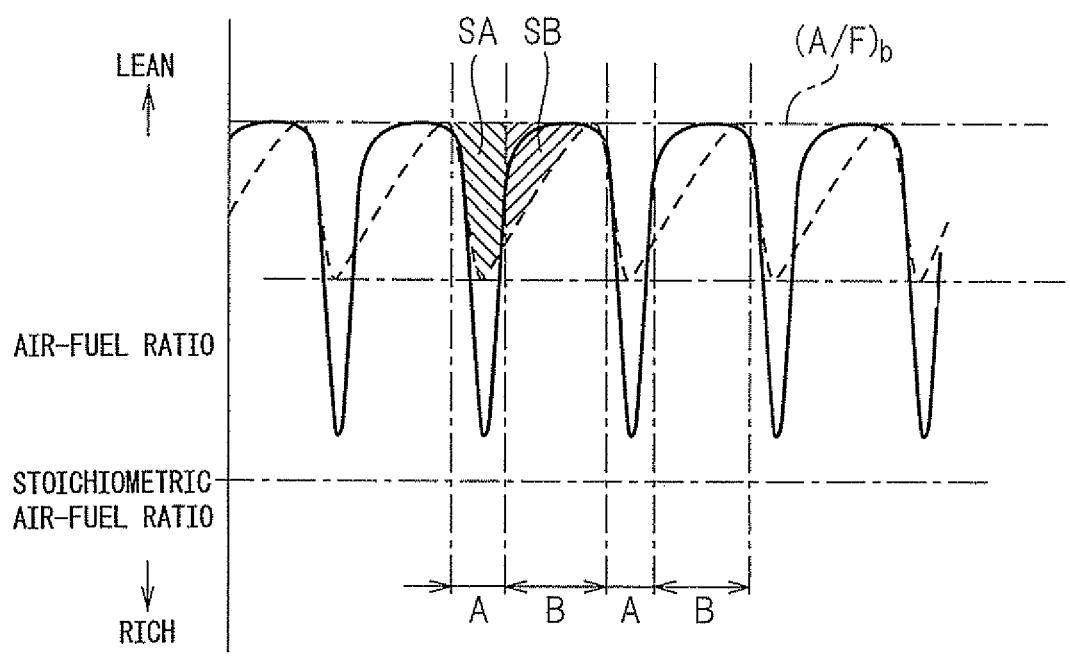
FIGS. 26A and 26B are views which shows changes in an air-fuel ratio which is detected by a downstream side air-fuel ratio sensor.

As opposed to this, when the downstream side air-fuel ratio sensor 24 is poisoned by sulfur, as shown in FIG. 26A by the broken line, the air-fuel ratio which is detected by the downstream side air-fuel ratio sensor 24 continues to change exceeding the predetermined time period A. Note that, this predetermined time period A is the time period during which the instantaneous change of the air-fuel ratio which is detected by the downstream side air-fuel ratio sensor 24 is substantially completed when hydrocarbons are injected once from the hydrocarbon feed valve 15 in the case where the downstream side air-fuel ratio sensor 24 is not poisoned by sulfur.

In this embodiment, in FIG. 26A, the integrated value of the difference SA between the air-fuel ratio detected by the downstream side air-fuel ratio sensor 24 and the base air-fuel ratio (A/F)b in a predetermined time period A, that is, the area SA, and the integrated value of the difference SB between the air-fuel ratio detected by the downstream side air-fuel ratio sensor 24 and the base air-fuel ratio (A/F)b in a time period B between a time period A and time period A, that is, the area SB, are calculated. In this case, from FIG. 26A, it is learned that, when the downstream side air-fuel ratio sensor 24 is not poisoned by sulfur as shown by the solid line, the area SA is large, but the area SB is almost zero, and conversely, when the downstream side air-fuel ratio sensor 24 is poisoned by sulfur as shown by the broken line, the area SA becomes smaller and the area SB becomes larger.

Figure 26B:
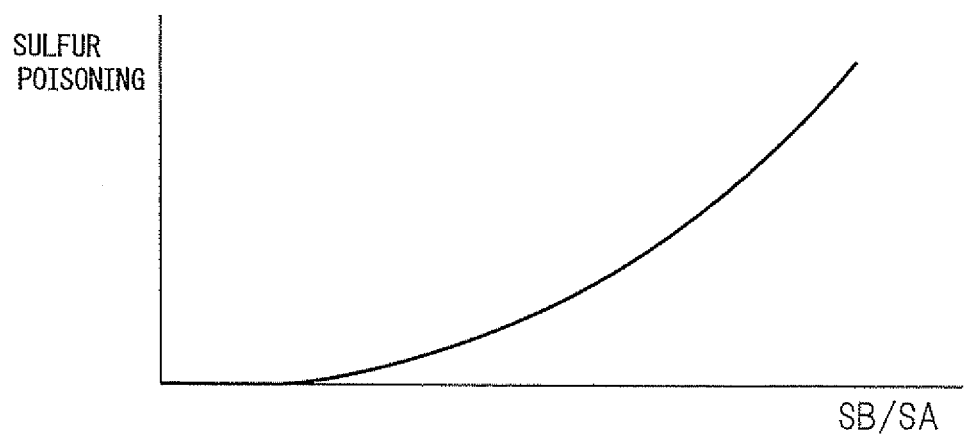

That is, it is learned that the amount of sulfur poisoning of the downstream side air-fuel ratio sensor 24 occurs remarkably in the ratio of the area SB to the area SA. FIG. 26B shows the relationship between the ratio SB/SA of the area SB to the area SA and the amount of sulfur poisoning. It is learned that the larger this ratio SB/SA, the larger the amount of sulfur poisoning.

Therefore, in this embodiment according to the present invention, the integrated values of the differences SA and SB between the air-fuel ratio detected by the downstream side air-fuel ratio sensor 24 and the base air-fuel ratio (A/F)b are calculated. The air-fuel ratio which is detected by the downstream side air-fuel ratio sensor 24 when the air-fuel ratio of the exhaust gas changes instantaneously finishes changing instantaneously within the predetermined time period A unless the downstream side air-fuel ratio sensor 24 is poisoned by sulfur, but if the amount of sulfur poisoning of the downstream side air-fuel ratio sensor 24 increases, continues changing over the predetermined time period A. The amount of sulfur poisoning of the downstream side air-fuel ratio sensor 24 is detected from the ratio SB/SA of the integrated value SA in the predetermined time period A and the integrated value SB when exceeding the predetermined time period A.

In this case, as the value of the integrated value SA, the average value of the air-fuel ratios while fluctuating several times can be used. For the value of the integrated value SB as well, the average value of the air-fuel ratios while fluctuating several times can be used.

In this way, the amount of sulfur poisoning of the downstream side air-fuel ratio sensor 24 can be found from the rich side peak air-fuel ratio (A/F)z which is detected by the downstream side air-fuel ratio sensor 24 and can be found also from the ratio SB/SA of the integrated values of the differences SA and SB between the air-fuel ratio detected by the downstream side air-fuel ratio sensor 24 and the base air-fuel ratio (A/F)b. Therefore, if expressing these comprehensively, a value which represents the change of the air-fuel ratio detected by the downstream side air-fuel ratio sensor 24 when sulfur poisoning does not occur is stored in advance as a reference value, and the amount of sulfur poisoning of the downstream side air-fuel ratio sensor 24 is detected from a value, representing the change of the air-fuel ratio detected by the downstream side air-fuel ratio sensor 24, to this reference value.

In this case, in the embodiment which is shown in FIG. 23A, the value which represents the change of the air-fuel ratio detected by the downstream side air-fuel ratio sensor 24 is the rich side peak air-fuel ratio (A/F)z, while the reference value is the rich side peak air-fuel ratio (A/F)p which is stored in advance shown in FIG. 24. On the other hand, in the embodiment which is shown in FIG. 26A, the value which represents the change of the air-fuel ratio detected by the downstream side air-fuel ratio sensor 24 is the ratio SB/SA of the integrated value SA within the predetermined time period A and the integrated value SB when exceeding the predetermined time period A. In this case, the reference value is about zero (SB/SA≈0).

In this regard, it is also possible to find these reference values in advance or possible to measure them. However, in the latter case, that is, the case of measuring the reference values, when the downstream side air-fuel ratio sensor 24 is poisoned by sulfur, it becomes necessary to perform processing to restore the sulfur poisoning before measuring the reference values. Next, this will be explained with reference to FIG. 27 based on the example of the case of finding the amount of sulfur poisoning of the downstream side air-fuel ratio sensor 24 from the rich side peak air-fuel ratio (A/F)z.

Figure 27:
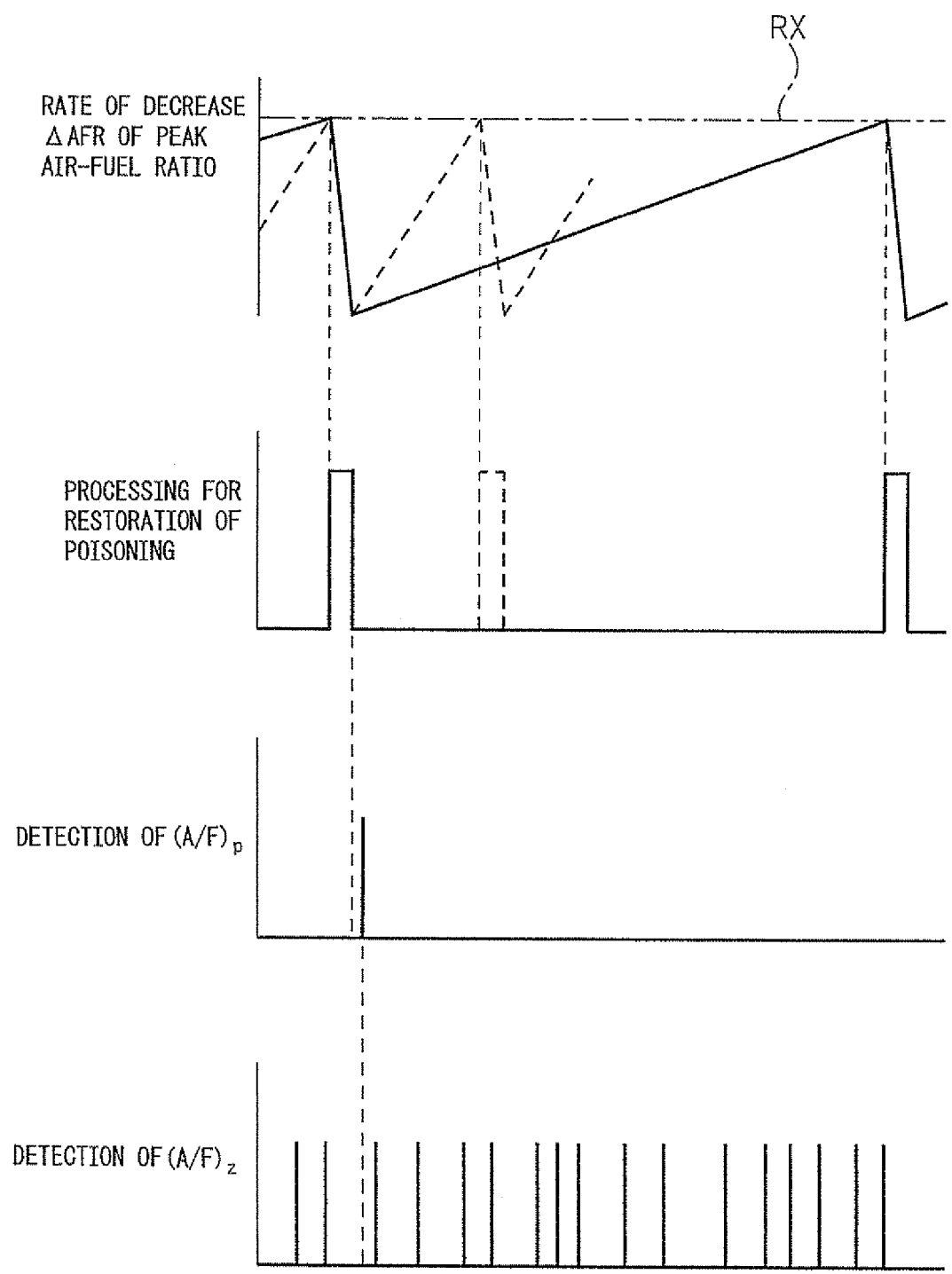
FIG. 27 is a time chart which shows changes in a rate of decrease of the peak air-fuel ratio.

Referring to FIG. 27, if the rate of decrease ΔAFR of the peak air-fuel ratio reaches the predetermined allowable value RX, processing for restoration of sulfur poisoning of the downstream side air-fuel ratio sensor 24 is performed. In this case, the $SO_x$ which was deposited at the downstream side air-fuel ratio sensor 24 is released from the downstream side air-fuel ratio sensor 24 if the temperature of the downstream side air-fuel ratio sensor 24 exceeds the $SO_x$ decomposition temperature of 650° C. or so, or the $SO_x$ which was deposited at the downstream side air-fuel ratio sensor 24 is released from the downstream side air-fuel ratio sensor 24 if the air-fuel ratio of the exhaust gas which flows into the downstream side air-fuel ratio sensor 24 is made rich and the temperature of the downstream side air-fuel ratio sensor 24 exceeds the $SO_x$ release temperature of 500° C. or so. Therefore, when the downstream side air-fuel ratio sensor 24 should be made to release the $SO_x$, that is, when sulfur poisoning of the downstream side air-fuel ratio sensor 24 should be restored, the temperature of the downstream side air-fuel ratio sensor 24 is made to rise to the $SO_x$ decomposition temperature of 650° C. or so, or the temperature of the downstream side air-fuel ratio sensor 24 is made to rise to the $SO_x$ release temperature of 500° C. or so and the air-fuel ratio of the exhaust gas which flows into the downstream side air-fuel ratio sensor 24 is made rich.

As shown in FIG. 27, when the processing for restoration of sulfur poisoning of the downstream side air-fuel ratio sensor 24 ends, the air-fuel ratio which is detected by the downstream side air-fuel ratio sensor 24 is used as the basis to detect the reference value rich side peak air-fuel ratio (A/F)p. Note that, even if the feed amount of hydrocarbons is the same, this rich side peak air-fuel ratio (A/F)p changes along with a change in the temperature of the downstream side air-fuel ratio sensor 24, that is, the temperature of the exhaust gas, and change of the flow rate of the exhaust gas. Therefore, in this embodiment according to the present invention, the temperature of the exhaust gas being within a predetermined temperature range and the flow rate of the exhaust gas, that is, the intake air amount, being within a predetermined flow rate range, are assumed as detection conditions for detection of the rich side peak air-fuel ratio (A/F)p. When the detection conditions are satisfied, the air-fuel ratio which is detected by the downstream side air-fuel ratio sensor 24 is used as the basis to detect the reference value rich side peak air-fuel ratio (A/F)p.

As shown in FIG. 27, if this reference value rich side peak air-fuel ratio (A/F)p is detected, each time the detection conditions are subsequently satisfied, the rich side peak air-fuel ratio (A/F)z is detected from the air-fuel ratio which is detected by the downstream side air-fuel ratio sensor 24 and the rate of decrease ΔAFR of the peak air-fuel ratio is calculated from the rich side peak air-fuel ratios (A/F)p and (A/F)z. Note that, in this embodiment according to the present invention, for example, if assuming that high sulfur concentration fuel is used, as shown in FIG. 27 by the broken line, the rate of decrease ΔAFR of the peak air-fuel ratio rapidly changes and the interval for the rate of decrease ΔAFR of the peak air-fuel ratio to reach the allowable value RX becomes shorter. Therefore, it is possible to detect from this that high sulfur concentration fuel has been used.

Further, if increasing the feed amount of hydrocarbons from the hydrocarbon feed valve 15, the change of the air-fuel ratio which is detected by the downstream side air-fuel ratio sensor 24 becomes greater and, as a result, the change of the rich side peak air-fuel ratio (A/F)z can be detected more accurately. Therefore, in the embodiment according to the present invention, as shown in FIG. 28, when detecting the reference value rich side peak air-fuel ratio (A/F)p and rich side peak air-fuel ratio (A/F)z, the feed amount of hydrocarbons from the hydrocarbon feed valve 15 is increased compared with the feed amount of hydrocarbons which is determined from the operating state of the engine. That is, the rich side peak air-fuel ratio of the air-fuel ratio of the exhaust gas is made further to the rich side.

Now then, if the exhaust gas contains $SO_2$, this $SO_2$ is oxidized on the platinum Pt 53 and becomes $SO_3$. Next, this $SO_3$ is stored inside of the basic layer 53, diffuses in the basic layer 53 in the form of sulfate ions $SO_4^{2-}$, and forms stable sulfates. However, these sulfates are stable and hard to break down. If just making the air-fuel ratio of the exhaust gas rich, the sulfates will remain as they are without being broken down. In this case, if the storage amount of the stored sulfates increases, the $NO_x$ purification rate will fall. Therefore, when the stored amount of sulfates increases, it is necessary to make the exhaust purification catalyst 13 release the stored $SO_x$.

In this regard, in this case, if making the temperature of the exhaust purification catalyst 13 rise to the $SO_x$ decomposition temperature of 650° C. or so or making the temperature of the exhaust purification catalyst 13 rise to the $SO_x$ release temperature of 500° C. or so and making the air-fuel ratio of the exhaust gas which flows into the exhaust purification catalyst 13 rich, it is possible to make the exhaust purification catalyst 13 release the stored $SO_x$.

Therefore, in this embodiment according to the present invention, when the stored $SO_x$ should be released from the exhaust purification catalyst 13, the fuel amount WR for addition to the combustion chamber 2 is controlled to make the air-fuel ratio (A/F)in of the exhaust gas which flows into the exhaust purification catalyst 13 alternately rich and lean as shown in FIG. 29 and thereby make the temperature of the exhaust purification catalyst 13 rise to the $SO_x$ release temperature of 500° C. or so and make the air-fuel ratio of the exhaust gas which flows into the exhaust purification catalyst 13 intermittently rich so as to make the exhaust purification catalyst 13 release the stored $SO_x$.

On the other hand, as explained earlier, in the present invention, the air-fuel ratio which is detected by the downstream side air-fuel ratio sensor 24 is used as the basis to calculate the amount of sulfur poisoning of the downstream side air-fuel ratio sensor 24. In this regard, if the amount of deposition of $SO_x$ at the downstream side air-fuel ratio sensor 24 increases, the stored amount of $SO_x$ at the exhaust purification catalyst 13 also increases. That is, the amount of sulfur poisoning of the exhaust purification catalyst 13 can be estimated from the amount of sulfur poisoning of the air-fuel ratio sensor. Therefore, in the embodiment according to the present invention, the amount of sulfur poisoning of the exhaust purification catalyst 13 is estimated from the change of the air-fuel ratio which is detected by the air-fuel ratio sensor. Specifically speaking, in the embodiment according to the present invention, the amount of sulfur poisoning of the exhaust purification catalyst 13 is estimated from the amount of sulfur poisoning of the downstream side air-fuel ratio sensor 24. In this case, in the embodiment according to the present invention, when the rate of decrease ΔAFR of the peak air-fuel ratio exceeds the allowable value, it is judged that the sulfur poisoning of the exhaust purification catalyst 13 also exceeds the allowable value. At this time, the air-fuel ratio (A/F)in of the exhaust gas which flows into the exhaust purification catalyst 13 is alternately switched between rich and lean as shown in FIG. 29 to release the stored $NO_x$ from the exhaust purification catalyst 13.

Figure 30:
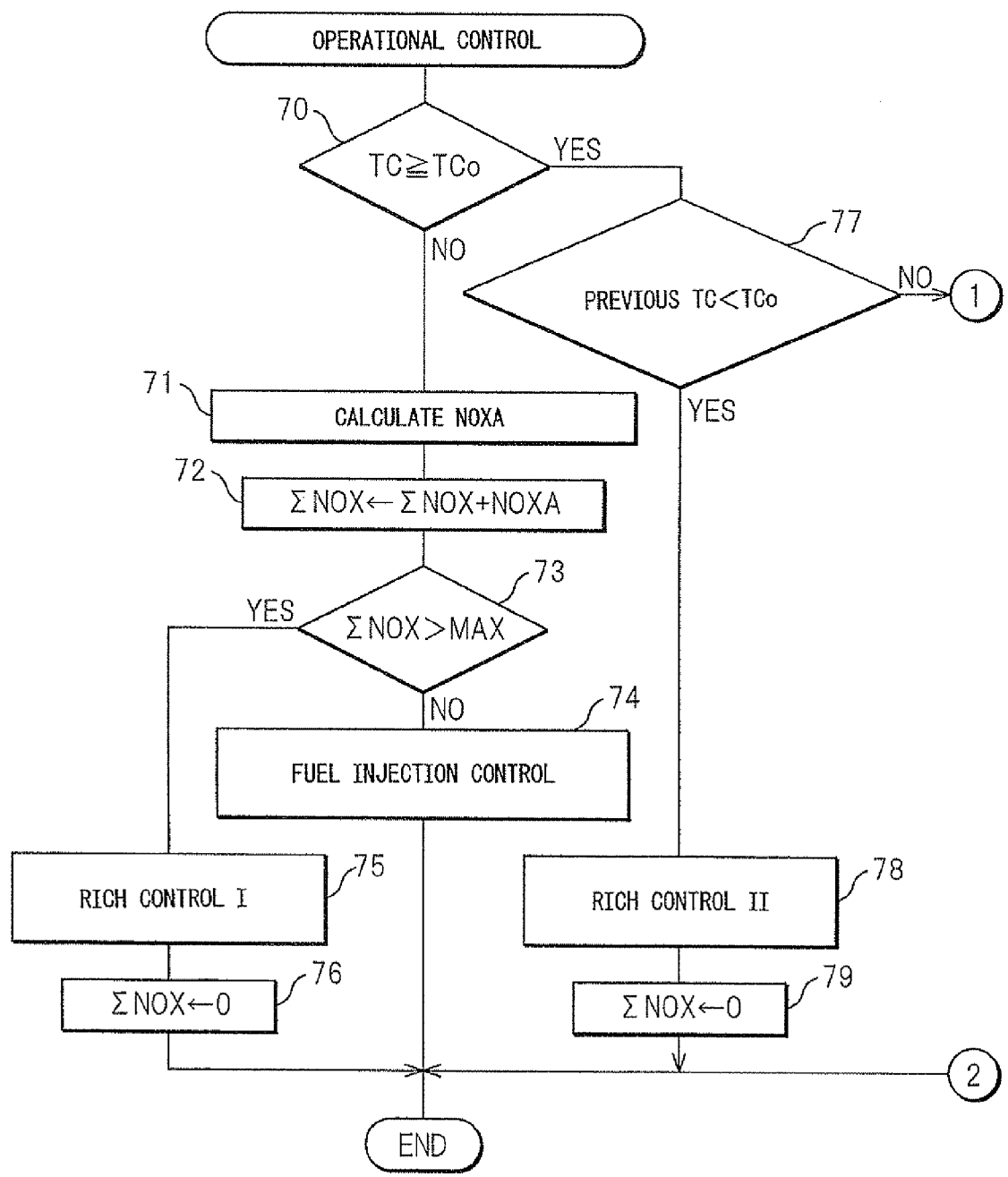
FIGS. 30 and 31 are flowcharts for operational control.
Figure 31:
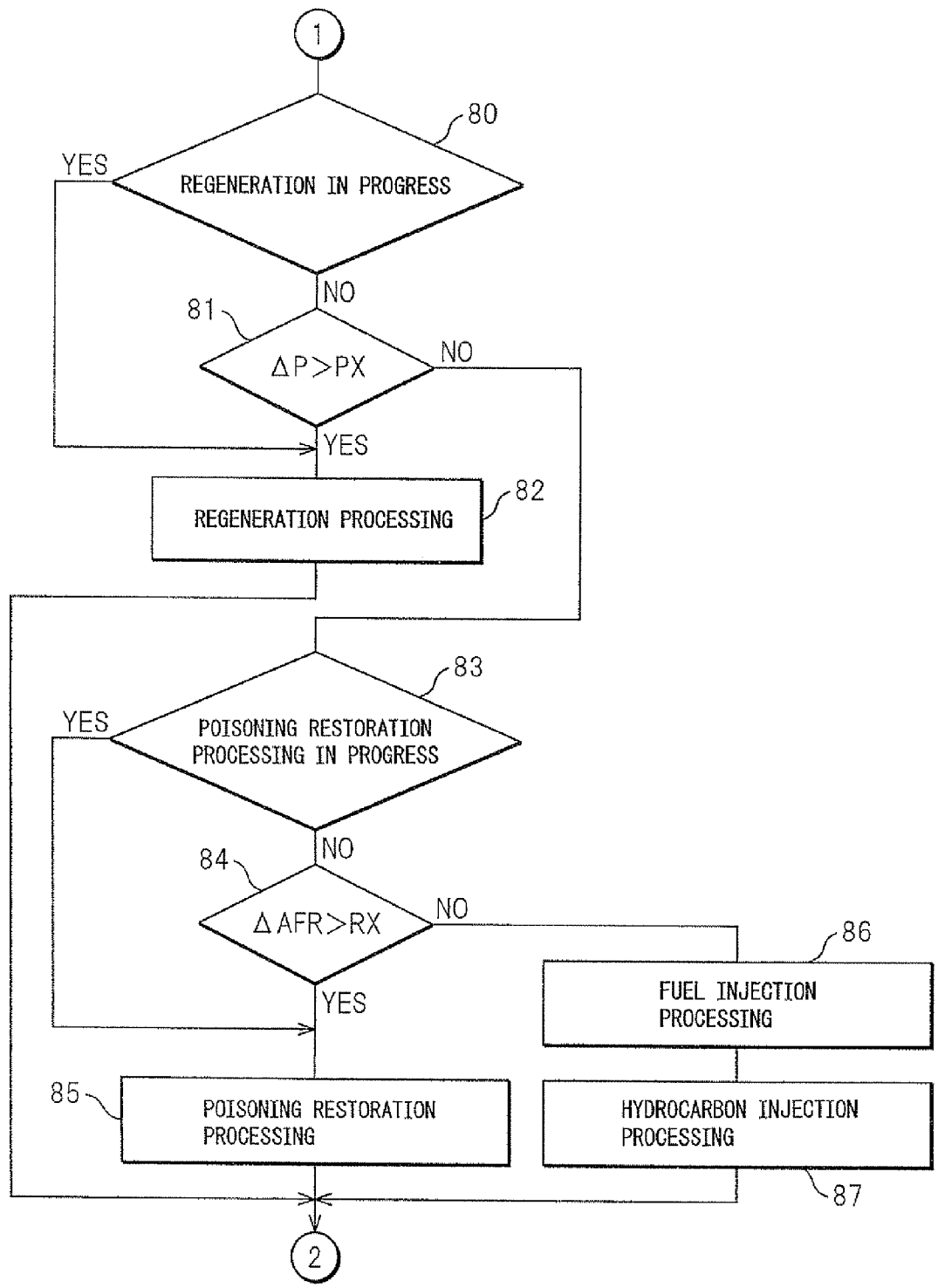

Next, the routine for operational control of the engine which is shown in FIGS. 30 and 31 will be explained. Note that, this routine is executed by interruption every constant time interval.

Referring to FIG. 30, first, at step 70, it is judged from the output signal of the temperature sensor 25 if the temperature TC of the exhaust purification catalyst 13 exceeds the activation temperature TCo. When TC<TCo, that is, when the exhaust purification catalyst 13 is not activated, it is judged that the second $NO_x$ purification method should be used, then the routine proceeds to step 71. At step 71, the $NO_x$ amount NOXA which is exhausted per unit time is calculated from the map which is shown in FIG. 17. Next, at step 72, ΣNOX is increased by the exhausted $NO_x$ amount NOXA so as to calculate the stored $NO_x$ amount ΣNOX. Next, at step 73, it is judged if the stored $NO_x$ amount ΣNOX exceeds an allowable value MAX.

When it is judged at step 73 that ΣNOX≤MAX, the routine proceeds to step 74 where processing for injecting fuel from the fuel injector 3 is performed. At this time, fuel is injected from the fuel injector 3 so that a predetermined lean air-fuel ratio which is determined from the operating state of the engine is obtained. As opposed to this, when it is judged at step 73 that ΣNOX>MAX, the routine proceeds to step 75 where rich control I is performed. That is, the additional fuel amount WR is calculated from the map which is shown in FIG. 19 and an injection action of the additional fuel is performed. At this time, the stored $NO_x$ is released from the exhaust purification catalyst 13. Next, at step 76, ΣNOX is cleared.

On the other hand, when it is judged at step 70 that TC≥TCo, that is, when the exhaust purification catalyst 13 is activated, the routine proceeds to step 77 where it is judged if TC<TCo stood at the time of the previous interruption. When TC<TCo stood at the time of the previous interruption, that is, when the exhaust purification catalyst 13 is currently activated, the routine proceeds to step 78 where rich control II is performed. At this time as well, the additional fuel amount WR is calculated from the map which is shown in FIG. 19 and an injection action of the additional fuel is performed to make the exhaust purification catalyst 13 release the stored $NO_x$. Next, at step 79, ΣNOX is cleared.

As opposed to this, when TC≥TCo stood even at the time of the previous interruption, that is, when the exhaust purification catalyst 13 was already activated, the routine proceeds to step 80 where the $NO_x$ purification action by the first $NO_x$ purification method according to the present invention is performed. That is, when the exhaust purification catalyst 13 is not activated, the $NO_x$ purification action is performed by the second $NO_x$ purification method, and when the exhaust purification catalyst 13 is activated, the second $NO_x$ purification method is switched to the first $NO_x$ purification method.

If the exhaust purification catalyst 13 stores $NO_x$, when the second $NO_x$ purification method is switched to the first $NO_x$ purification method, the exhaust purification catalyst 13 is made to release the stored $NO_x$ all at once without reduction. Therefore, in the example which is shown in FIG. 30, to prevent the exhaust purification catalyst 13 from being made to release the stored $NO_x$ all at once without reduction in this way, right before the second $NO_x$ purification method is switched to the first $NO_x$ purification method, at step 78, rich control II is performed for making the exhaust purification catalyst 13 release the stored $NO_x$ by the second $NO_x$ purification method.

Now then, referring to FIG. 31, first, at step 80, it is judged if regeneration of the particulate filter 14 is in progress. When regeneration of the particulate filter 14 is not in progress, the routine proceeds to step 81 where it is judged from the output signal of the differential pressure sensor 26 if the differential pressure $\Delta P$ before and after the particulate filter 14 exceeds a predetermined limit value PX. When $\Delta P \leq PX$, the routine proceeds to step 83 where it is judged if processing for making the exhaust purification catalyst 13 release the stored $SO_x$, that is, processing for restoration of sulfur poisoning of the exhaust purification catalyst 13, is being performed. When processing for restoration of sulfur poisoning of the exhaust purification catalyst 13 is not in progress, the routine proceeds to step 84 where the rate of decrease $\Delta AFR$ of the peak air-fuel ratio is calculated and it is judged if the calculated rate of decrease $\Delta AFR$ of the peak air-fuel ratio exceeds an allowable value RX. When $\Delta AFR \leq RX$, the routine proceeds to step 86.

At steps 86 and 87, the amount of fuel which is fed into an engine combustion chamber 2 is controlled based on the output signal of the upstream side air-fuel ratio sensor 23 so that the air-fuel ratio of the exhaust gas which is exhausted from the engine becomes a predetermined air-fuel ratio, and the amount of injection of hydrocarbons from the hydrocarbon feed valve 15 is controlled based on the output signal of the downstream side air-fuel ratio sensor 24 so that the amplitude of the change in concentration of hydrocarbons which flows into the exhaust purification catalyst 13 becomes within a predetermined range of amplitude.

Specifically speaking, at step 86, the fuel injection amount from the fuel injector 3 is controlled based on the output signal of the upstream side air-fuel ratio sensor 23 so that the air-fuel ratio of the exhaust gas which is exhausted from the engine becomes the optimal base air-fuel ratio (A/F)b in accordance with the operating state of the engine. Next, at step 87, feedback control based on the output signal of the downstream side air-fuel ratio sensor 24 is used for the $NO_x$ purification action by the first $NO_x$ purification method. That is, the rich side peak air-fuel ratio which is detected by the downstream side air-fuel ratio sensor 24 when the hydrocarbon injection period is made the optimal hydrocarbon injection period $\Delta T$ shown FIG. 20A and the hydrocarbon injection period is made the optimal hydrocarbon injection period WT shown in FIG. 20B is stored in advance as the target peak air-fuel ratio. At step 87, the rich side peak air-fuel ratio which is detected by the downstream side air-fuel ratio sensor 24 is made the target peak air-fuel ratio by feedback control of the injection time of hydrocarbons from the hydrocarbon feed valve 15.

On the other hand, when it is judged at step 81 that $\Delta P > PX$, the routine proceeds to step 83 where processing for regeneration of the particulate filter 14 is performed. Next, the processing cycle is ended. Further, when it is judged at step 84 that $\Delta AFR > RX$, the routine proceeds to step 85 where processing for making the exhaust purification catalyst 13 release the stored $SO_x$, that is, processing for restoration of sulfur poisoning of the exhaust purification catalyst 13, is performed. At the same time as this, sulfur poisoning of the downstream side air-fuel ratio sensor 24 is also restored.

Now then, as explained earlier, the rate of decrease $\Delta AFR$ of the peak air-fuel ratio is calculated based on a reference value. This reference value may be found in advance or may be actually measured. However, if actually measuring the reference value, as explained earlier, it becomes necessary to perform processing for restoration of sulfur poisoning of the downstream side air-fuel ratio sensor 24 before measuring the reference value. At this time, that is, when sulfur poisoning of the downstream side air-fuel ratio sensor 24 should be restored, as explained earlier, the temperature of the downstream side air-fuel ratio sensor 24 is made to rise up to the $SO_x$ decomposition temperature of 650° C. or so or the temperature of the downstream side air-fuel ratio sensor 24 is made to rise up to the $SO_x$ release temperature of 500° C. or so and the air-fuel ratio of the exhaust gas which flows into the downstream side air-fuel ratio sensor 24 is made rich.

Next, several examples for measurement of this reference value will be explained.

As explained earlier, if processing for restoration of sulfur poisoning of the exhaust purification catalyst 13 is performed, the sulfur poisoning of the downstream side air-fuel ratio sensor 24 is also restored. Therefore, in the first example, when detection conditions are satisfied after the processing for restoration of sulfur poisoning of the exhaust purification catalyst 13 has finished, the rich side peak air-fuel ratio (A/F)p is detected from the air-fuel ratio which is detected by the downstream side air-fuel ratio sensor 24. Note that, as explained earlier, it is judged that the detection conditions are satisfied when the temperature of the exhaust gas is within a predetermined temperature range and the flow rate of the exhaust gas, that is, the intake air amount, is within a predetermined flow rate range.

Figure 32:
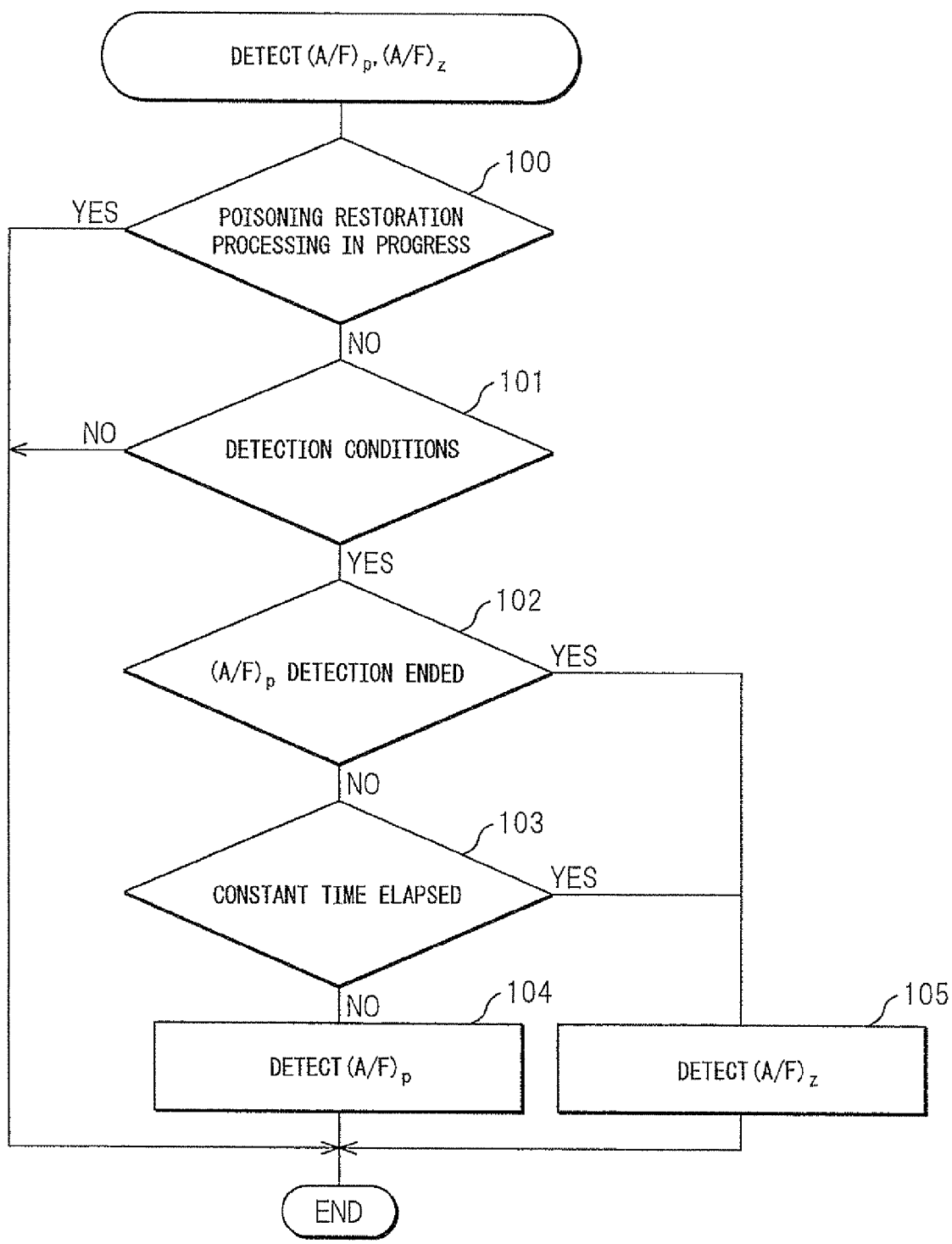
FIG. 32 is a flowchart which shows one embodiment of a peak air-fuel ratio detection routine.

FIG. 32 shows the detection routine of the rich side peak air-fuel ratios (A/F)p and (A/F)z for working this example. This routine is executed by interruption every predetermined time interval.

Referring to FIG. 32, first, at step 100, it is judged if processing for restoration of sulfur poisoning of the exhaust purification catalyst 13 is in progress. If processing for restoration of sulfur poisoning of the exhaust purification catalyst 13 is in progress, the processing cycle is ended. As opposed to this, if processing for restoration of sulfur poisoning of the exhaust purification catalyst 13 is not in progress, the routine proceeds to step 101 where it is judged if detection conditions are satisfied. If the detection conditions are not satisfied at this time, the processing cycle is ended. As opposed to this, when the detection conditions are satisfied, the routine proceeds to step 102 where it is judged if the detection of the reference rich side peak air-fuel ratio (A/F)p by the downstream side air-fuel ratio sensor 24 has finished. When the detection of the rich side peak air-fuel ratio (A/F)p has not finished, the routine proceeds to step 103 where it is judged if a fixed time has elapsed from the end of the processing for restoration of sulfur poisoning of the exhaust purification catalyst 13. When the fixed time has not elapsed from the end of the processing for restoration of sulfur poisoning of the exhaust purification catalyst 13, the routine proceeds to step 104 where the reference rich side peak air-fuel ratio (A/F)p is detected by the downstream side air-fuel ratio sensor 24.

That is, when the fixed time has not elapsed from the end of the processing for restoration of sulfur poisoning of the exhaust purification catalyst 13, it is believed that the downstream side air-fuel ratio sensor 24 is not poisoned by sulfur. Therefore, when the detection conditions are satisfied when the fixed time has not elapsed from the end of processing for restoration of sulfur poisoning of the exhaust purification catalyst 13, the reference rich side peak air-fuel ratio (A/F)p is detected. On the other hand, when it is judged at step 102 that detection of the reference rich side peak air-fuel ratio (A/F)p has ended or when it is judged at step 103 that the fixed time has elapsed from the end of the processing for restoration of sulfur poisoning of the exhaust purification catalyst 13, the routine proceeds to step 105 where the rich side peak air-fuel ratio (A/F)z is detected from the air-fuel ratio which is detected by the downstream side air-fuel ratio sensor 24. That is, each time the detection conditions are satisfied, the rich side peak air-fuel ratio (A/F)z is detected. The rate of decrease ΔAFR of the peak air-fuel ratio is calculated from newest reference rich side peak air-fuel ratio (A/F)p and newest rich side peak air-fuel ratio (A/F)z at step 84 of FIG. 31.

On the other hand, at the time of regeneration of the particulate filter 14, the feed amount of hydrocarbons is made to increase and the temperature of the particulate filter 14 is made to rise to 650° C. or so. Therefore, if processing for regeneration of the particulate filter 14 is performed, the sulfur poisoning of the downstream side air-fuel ratio sensor 24 is also restored. Therefore, in a second example, when detection conditions are satisfied after the processing for regeneration of the particulate filter 14 is ended, the rich side peak air-fuel ratio (A/F)p is detected from the air-fuel ratio which is detected by the downstream side air-fuel ratio sensor 24.

Figure 33:
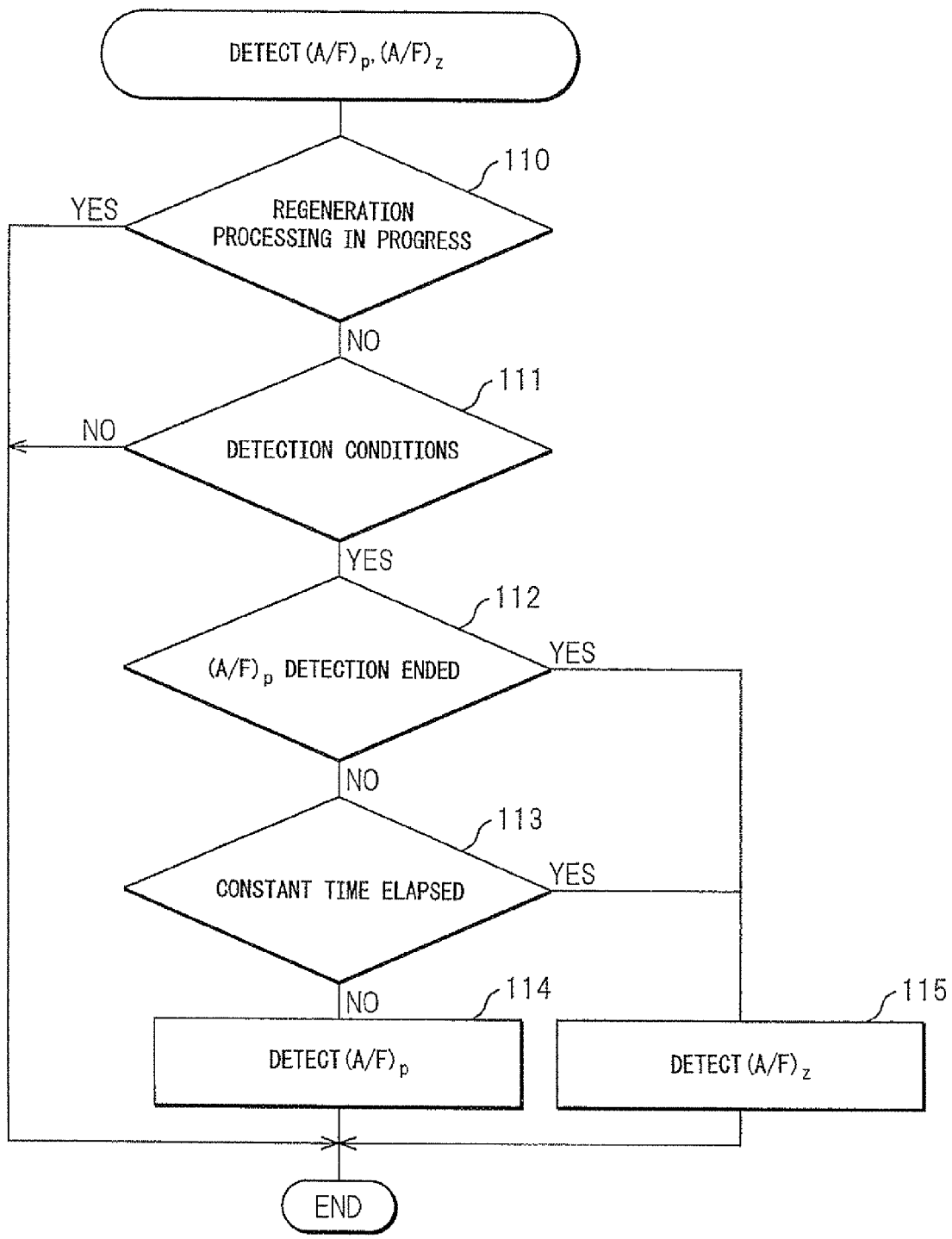
FIG. 33 is a flowchart which shows another embodiment of a peak air-fuel ratio detection routine.

FIG. 33 shows a detection routine of the rich side peak air-fuel ratio (A/F)p and (A/F)z for working this second example. This routine is also executed by interruption every predetermined time interval.

Referring to FIG. 33, first, at step 110, it is judged if processing for regeneration of the particulate filter 14 is in progress. When processing for regeneration of the particulate filter 14 is in progress, the processing cycle is ended. As opposed to this, when processing for regeneration of the particulate filter 14 is not in progress, the routine proceeds to step 111 where it is judged if detection conditions are satisfied. If the detection conditions are not satisfied at this time, the processing cycle is ended. As opposed to this, when the detection conditions are satisfied, the routine proceeds to step 112 where it is judged if the detection of the reference rich side peak air-fuel ratio (A/F)p by the downstream side air-fuel ratio sensor 24 has finished. When the detection of the rich side peak air-fuel ratio (A/F)p has not, the routine proceeds to step 113 where it is judged if the fixed time has elapsed from the end of the processing for regeneration of the particulate filter 14. When the fixed time has not elapsed from the end of the processing for regeneration of the particulate filter 14, the routine proceeds to step 114 where the reference rich side peak air-fuel ratio (A/F)p is detected by the downstream side air-fuel ratio sensor 24.

That is, when the fixed time has not elapsed from the end of the processing for regeneration of the particulate filter 14, it is believed that the downstream side air-fuel ratio sensor 24 is not poisoned by sulfur. Therefore, when the detection conditions are satisfied when the fixed time has not elapsed from the end of processing for regeneration of the particulate filter 14, the reference rich side peak air-fuel ratio (A/F)p is detected. On the other hand, when it is judged at step 112 that the detection of the reference rich side peak air-fuel ratio (A/F)p has finished or at step 113 that fixed time elapsed from the end of the processing for regeneration of the particulate filter 14, the routine proceeds to step 115 where the rich side peak air-fuel ratio (A/F)z is detected from the air-fuel ratio which is detected by the downstream side air-fuel ratio sensor 24. That is, in this case as well, the rich side peak air-fuel ratio (A/F)z is detected each time the detection conditions are satisfied. The rate of decrease ΔAFR of the peak air-fuel ratio is calculated from these newest reference rich side peak air-fuel ratio (A/F)p and newest rich side peak air-fuel ratio (A/F)z.

On the other hand, as explained earlier, before the exhaust purification catalyst 13 is activated, the $NO_x$ purification action is performed by the second $NO_x$ purification method. At this time, if the stored $NO_x$ amount ΣNOX which is stored at the basic layer 53 exceeds the predetermined allowable amount MAX, rich processing is performed to make the air-fuel ratio (A/F)in of the exhaust gas which flows into the exhaust purification catalyst 13 temporarily rich. In this case, if assuming that this rich processing is performed at the time of engine high load, at this time, the temperature of the downstream side air-fuel ratio sensor 24 is made to rise to the $SO_x$ release temperature of 500° C. or so and the air-fuel ratio of the exhaust gas which flows into the downstream side air-fuel ratio sensor 24 becomes rich. Therefore, at this time, the sulfur poisoning of the downstream side air-fuel ratio sensor 24 is restored.

Therefore, in a third example, when rich processing is performed at the time of engine high load operation, if the detection conditions are satisfied after the end of the rich processing, the rich side peak air-fuel ratio (A/F)p is detected from the air-fuel ratio which is detected by the downstream side air-fuel ratio sensor 24.

Figure 34:
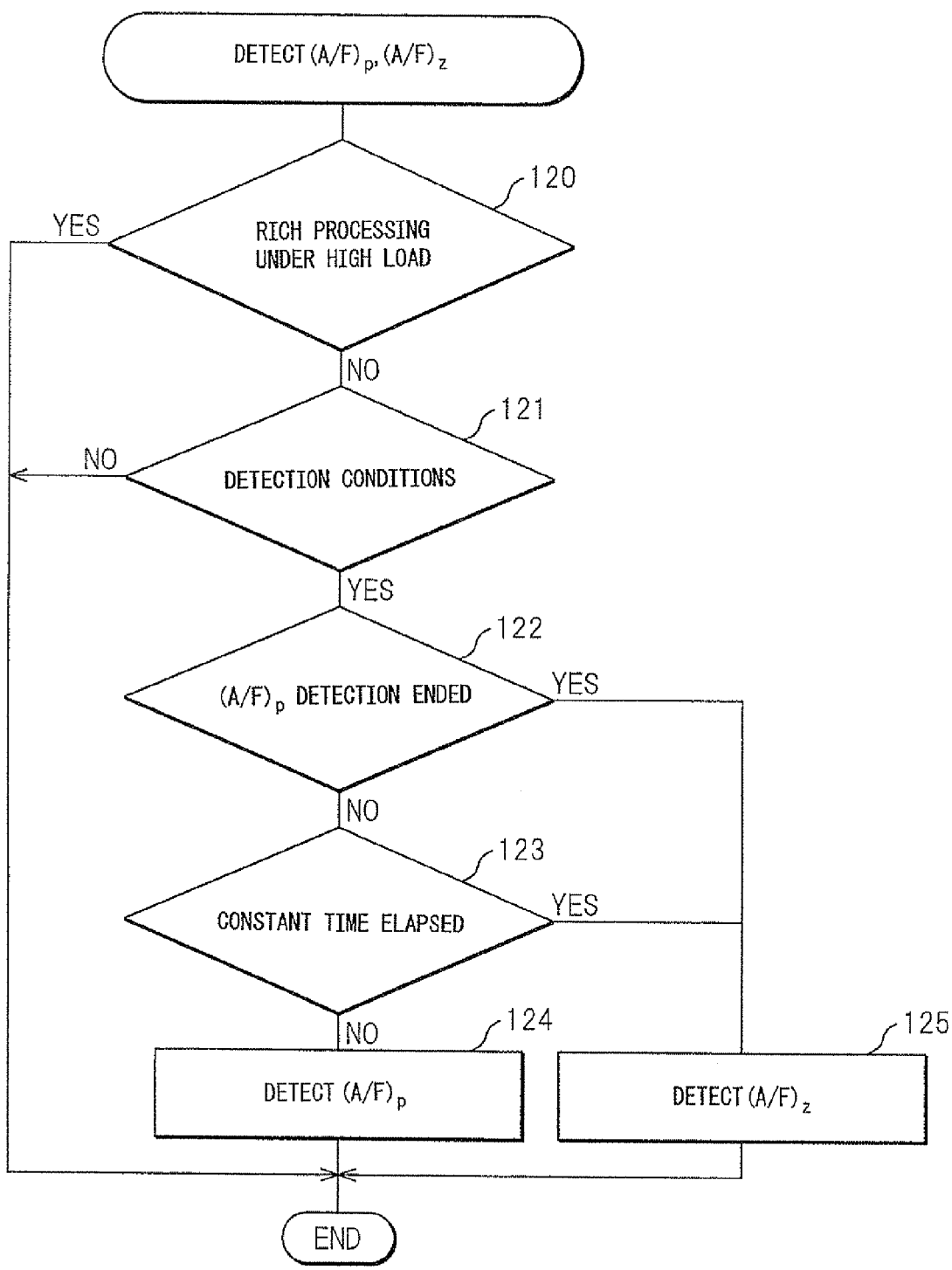
FIG. 34 is a flowchart which shows still another embodiment of a peak air-fuel ratio detection routine.

FIG. 34 shows a detection routine of the rich side peak air-fuel ratio (A/F)p and (A/F)z for working this third example. This routine is also executed every predetermined time interval.

Referring to FIG. 34, first, at step 120, it is judged if the rich processing at the time of engine high load operation is in progress. When rich processing is in progress, the processing cycle is ended. As opposed to this, when rich processing is not in progress, the routine proceeds to step 121 where it is judged if the detection conditions are satisfied. If the detection conditions are not satisfied at this time, the processing cycle is ended. As opposed to this, when the detection conditions are satisfied, the routine proceeds to step 122 where it is judged if the detection of the reference rich side peak air-fuel ratio (A/F)p by the downstream side air-fuel ratio sensor 24 has finished. When the detection of the rich side peak air-fuel ratio (A/F)p has not finished, the routine proceeds to step 123 where it is judged if the fixed time has elapsed from the end of the rich processing. When the fixed time has not elapsed from the end of the rich processing, the routine proceeds to step 124 where the reference rich side peak air-fuel ratio (A/F)p is detected by the downstream side air-fuel ratio sensor 24.

That is, when the fixed time has not elapsed from the end of the rich processing at the time of engine high load operation, it is believed that the downstream side air-fuel ratio sensor 24 is not poisoned by sulfur. Therefore, when the fixed time has not elapsed from the end of the rich processing and when the detection conditions are satisfied, the reference rich side peak air-fuel ratio (A/F)p is detected. On the other hand, when it is judged at step 122 that the detection of the reference rich side peak air-fuel ratio (A/F)p has finished or when it is judged at step 123 that the fixed time has elapsed from the end of the rich processing, the routine proceeds to step 125 where the rich side peak air-fuel ratio (A/F)z is detected from the air-fuel ratio which is detected by the downstream side air-fuel ratio sensor 24. That is, in this case as well, the rich side peak air-fuel ratio (A/F)z is detected each time the detection conditions are satisfied. The rate of decrease ΔAFR of the peak air-fuel ratio is calculated from these newest reference rich side peak air-fuel ratio (A/F)p and newest rich side peak air-fuel ratio (A/F)z.

Note that, as another embodiment, it is also possible to arrange an oxidation catalyst for reforming the hydrocarbons inside the engine exhaust passage upstream of the exhaust purification catalyst 13.

REFERENCE SIGNS LIST

4 ... intake manifold
5 ... exhaust manifold
7 ... exhaust turbocharger
12a, 12b ... exhaust pipe
13 ... exhaust purification catalyst
14 ... particulate filter
15 ... hydrocarbon feed valve

The invention claimed is:

1. An exhaust purification system of an internal combustion engine in which an air-fuel ratio sensor for detecting an air-fuel ratio of exhaust gas is arranged in an engine exhaust passage and an exhaust purification control is performed based on an air-fuel ratio detected by the air-fuel ratio sensor, wherein the air-fuel ratio sensor is comprised of a type of sensor which has a solid electrolyte, electrodes respectively covering two side surfaces of the solid electrolyte, and a diffusion resistance layer covering one of electrodes and in which exhaust gas is guided on to the diffusion resistance layer, when the air-fuel ratio of the exhaust gas changes and the air-fuel ratio detected by the air-fuel ratio sensor changes, the change of the air-fuel ratio detected by the air-fuel ratio sensor is governed by an amount of deposition of sulfur ingredients at the air-fuel ratio sensor, at this time, the larger the amount of deposition of sulfur ingredients at the air-fuel ratio sensor becomes, the smaller an amount of change of the air-fuel ratio detected by the air-fuel ratio sensor and the longer a time period of change of the air-fuel ratio become, and an amount of sulfur poisoning of the air-fuel ratio sensor is detected from the change of the air-fuel ratio detected by the air-fuel ratio sensor at this time.

2. An exhaust purification system of an internal combustion engine as claimed in claim 1 wherein an exhaust purification catalyst is arranged in the engine exhaust passage and the amount of sulfur poisoning of said exhaust purification catalyst is estimated from the change of the air-fuel ratio detected by the air-fuel ratio sensor.

3. An exhaust purification system of an internal combustion engine as claimed in claim 2 wherein a hydrocarbon feed valve for feeding hydrocarbons is arranged in the engine exhaust passage upstream of said exhaust purification catalyst, $NO_x$ contained in the exhaust gas and reformed hydrocarbons are made to react in said exhaust purification catalyst, precious metal catalysts are carried on an exhaust gas flow surface of said exhaust purification catalyst and a basic exhaust gas flow surface part is formed around said precious metal catalysts, said exhaust purification catalyst has a property of reducing the $NO_x$ which is contained in exhaust gas if a concentration of hydrocarbons which flow into the exhaust purification catalyst is made to vibrate by within a predetermined range of amplitude and within a predetermined range of period and has a property of being increasing in storage amount of $NO_x$ which is contained in exhaust gas if the vibration period of the hydrocarbon concentration is made longer than the predetermined range, at the time of engine operation, an injection period of hydrocarbons from the hydrocarbon feed valve is controlled so that the concentration of hydrocarbons which flow into the exhaust purification catalyst vibrates by within the predetermined range of period, and an injection amount of hydrocarbons from the hydrocarbon feed valve is controlled so that the amplitude of the change of concentration of hydrocarbons which flow into the exhaust purification catalyst becomes within the predetermined range of amplitude.

4. An exhaust purification system of an internal combustion engine as claimed in claim 3 wherein said air-fuel ratio sensor is arranged downstream of the exhaust purification catalyst and the amount of injection of hydrocarbons from the hydrocarbon feed valve is controlled based on an output signal of the air-fuel ratio sensor so that the amplitude of the change in concentration of hydrocarbons which flow into the exhaust purification catalyst becomes within the predetermined range of amplitude.

5. An exhaust purification system of an internal combustion engine as claimed in claim 3 wherein said air-fuel ratio sensor is comprised of an upstream side air-fuel ratio sensor which is arranged in the engine exhaust passage upstream of the hydrocarbon feed valve and a downstream side air-fuel ratio sensor which is arranged in the engine exhaust passage downstream of the exhaust purification catalyst an amount of fuel fed into an engine combustion chamber is controlled based on an output signal of said upstream side air-fuel ratio sensor so that on air-fuel ratio of the exhaust gas which is exhausted from the engine becomes a predetermined air-fuel ratio, and the amount of injection of hydrocarbons from the hydrocarbon feed valve is controlled based on an output signal of said downstream side air-fuel ratio sensor so that the amplitude of the change in concentration of hydrocarbons which flow into the exhaust purification catalyst becomes within the predetermined range of amplitude.

6. An exhaust purification system of an internal combustion engine as claimed in claim 3 wherein said air-fuel ratio sensor is arranged downstream of the exhaust purification catalyst, and it is judged if the downstream side air-fuel ratio sensor is poisoned by sulfur or the hydrocarbon feed valve is clogged from the change of the air-fuel ratio detected by the air-fuel ratio sensor.

7. An exhaust purification system of an internal combustion engine as claimed in claim 3, wherein in said exhaust purification catalyst, $NO_x$ contained in exhaust gas and reformed hydrocarbons react whereby a reducing intermediate containing nitrogen and hydrocarbons is produced and wherein an injection period of the hydrocarbons is a period necessary for continued production of the reducing intermediate.

8. An exhaust purification system of an internal combustion engine as claimed in claim 7, wherein the injection period of the hydrocarbons is 0.3 second to 5 seconds.

9. An exhaust purification system of an internal combustion engine as claimed in claim 1, wherein said precious metal catalyst is comprised of platinum Pt and at least one of rhodium Rh and palladium Pd.

10. An exhaust purification system of an internal combustion engine as claimed in claim 3, wherein a basic layer containing an alkali metal, an alkali earth metal, a rare earth, or a metal which can donate electrons to $NO_x$ is formed on the exhaust gas flow surface of the exhaust purification catalyst and wherein a surface of said basic layer forms said basic exhaust gas flow surface part.

11. An exhaust purification system of an internal combustion engine as claimed in claim 1 wherein said air-fuel ratio sensor is arranged downstream of the exhaust purification catalyst, a value which represents the change of the air-fuel ratio detected by the air-fuel ratio sensor when sulfur poisoning has not occurred is found in advance as a reference value, and an amount of sulfur poisoning of the air-fuel ratio sensor is detected from a value which represents the change of the air-fuel ratio detected by the air-fuel ratio sensor to the reference value.

12. An exhaust purification system of an internal combustion engine as claimed in claim 11 wherein the value which represents the change of the air-fuel ratio detected by the air-fuel ratio sensor is a rich side peak air-fuel ratio.

13. An exhaust purification system of an internal combustion engine as claimed in claim 11 wherein an integrated value of a difference between the air-fuel ratio detected by the air-fuel ratio sensor and a base air-fuel ratio is calculated, the air-fuel ratio which is detected by the air-fuel ratio sensor when an air-fuel ratio of the exhaust gas changes instantaneously finishes changing instantaneously within a predetermined time period if the air-fuel ratio sensor is not poisoned by sulfur, but if the sulfur poisoning of the air-fuel ratio sensor increases, continues changing over said predetermined time period, and the value which represents the change of the air-fuel ratio detected by the air-fuel ratio sensor is a ratio of said integrated value in said predetermined time period and the integrated value when said predetermined time period is exceeded.

14. An exhaust purification system of an internal combustion engine as claimed in claim 11 wherein said reference value is detected when sulfur poisoning of the air-fuel ratio sensor has been restored by an exhaust gas temperature being made to rise or by an air-fuel ratio of the exhaust gas being made rich or both.

15. An exhaust purification system of an internal combustion engine as claimed in claim 11 wherein when finding the value which represents the change of the air-fuel ratio detected by the air-fuel ratio sensor, a rich side peak air-fuel ratio of an air-fuel ratio of the exhaust gas is made further to a rich side.

* * * * *